(12) United States Patent
Usukura et al.

(10) Patent No.: US 10,895,748 B2
(45) Date of Patent: Jan. 19, 2021

(54) DISPLAY DEVICE INCLUDING OPTICAL MEMBER INCLUDING LIGHT REFRACTING PORTION AND HEAD-MOUNTED DISPLAY INCLUDING THE SAME

(71) Applicant: SHARP KABUSHIKI KAISHA, Sakai (JP)

(72) Inventors: Naru Usukura, Sakai (JP); Hiromi Katoh, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 77 days.

(21) Appl. No.: 16/086,603

(22) PCT Filed: Mar. 17, 2017

(86) PCT No.: PCT/JP2017/010910
§ 371 (c)(1),
(2) Date: Sep. 20, 2018

(87) PCT Pub. No.: WO2017/164117
PCT Pub. Date: Sep. 28, 2017

(65) Prior Publication Data
US 2019/0101759 A1    Apr. 4, 2019

(30) Foreign Application Priority Data
Mar. 24, 2016  (JP) .................. 2016-060403

(51) Int. Cl.
| G02B 5/04 | (2006.01) |
| G02B 27/01 | (2006.01) |
| F21V 8/00 | (2006.01) |
| G02B 5/02 | (2006.01) |
| G02F 1/13 | (2006.01) |
| G02B 3/08 | (2006.01) |
| G02F 1/1335 | (2006.01) |

(52) U.S. Cl.
CPC ............ *G02B 27/0172* (2013.01); *G02B 3/08* (2013.01); *G02B 5/0231* (2013.01);
(Continued)

(58) Field of Classification Search
None
See application file for complete search history.

(56) References Cited

U.S. PATENT DOCUMENTS 5,851,062 A   12/1998  Shinohara et al.
6,155,692 A   12/2000  Ohkawa
(Continued)

FOREIGN PATENT DOCUMENTS

JP   H07318729 A   12/1995
JP   H0954555 A    2/1997
(Continued)

*Primary Examiner* — Amr A Awad
*Assistant Examiner* — Donna V Lui
(74) *Attorney, Agent, or Firm* — ScienBiziP, P.C.

(57) ABSTRACT

A liquid crystal display device 10 includes a liquid crystal panel 11, a backlight device 12 supplying light to the liquid crystal panel 11, LEDs 13 included in the backlight device 12, a light guide plate 15 that is an optical member and included in the backlight device 12 and disposed opposite the liquid crystal panel 11 and has a light guide plate light exit surface 15a through which light from the LEDs 13 exits toward the liquid crystal panel 11, and a light guide plate side light collecting portion 20 included in the light guide plate 15, which is the optical member, and applying an anisotropic refracting action to at least light rays exiting an edge portion of the light guide plate light exit surface 15a to be directed to a middle section of the liquid crystal panel 11.

3 Claims, 18 Drawing Sheets

(52) U.S. Cl.
CPC ........... *G02B 5/0278* (2013.01); *G02B 5/045* (2013.01); *G02B 6/0036* (2013.01); *G02B 6/0038* (2013.01); *G02B 6/0046* (2013.01); *G02B 6/0053* (2013.01); *G02B 6/0061* (2013.01); *G02F 1/13* (2013.01); *G02F 1/133526* (2013.01); *G02B 2027/0118* (2013.01)

(56) References Cited

U.S. PATENT DOCUMENTS

| | | | |
|---|---|---|---|
| 6,799,859 | B1 | 10/2004 | Ida et al. |
| 2006/0244877 | A1* | 11/2006 | Noh .................... G02B 6/0056 349/64 |
| 2009/0284687 | A1* | 11/2009 | Kirita ................ G02F 1/133621 349/65 |
| 2010/0135038 | A1* | 6/2010 | Handschy ........... G02B 6/0035 362/606 |
| 2012/0113158 | A1 | 5/2012 | Goto et al. |
| 2014/0049944 | A1* | 2/2014 | Niioka .................... G02B 3/08 362/97.1 |

FOREIGN PATENT DOCUMENTS

| | | |
|---|---|---|
| JP | H10170860 A | 6/1998 |
| JP | H10319242 A | 12/1998 |
| JP | H111120810 A | 4/1999 |
| JP | 2012084505 A | 4/2012 |
| WO | 0208662 A1 | 1/2002 |

* cited by examiner

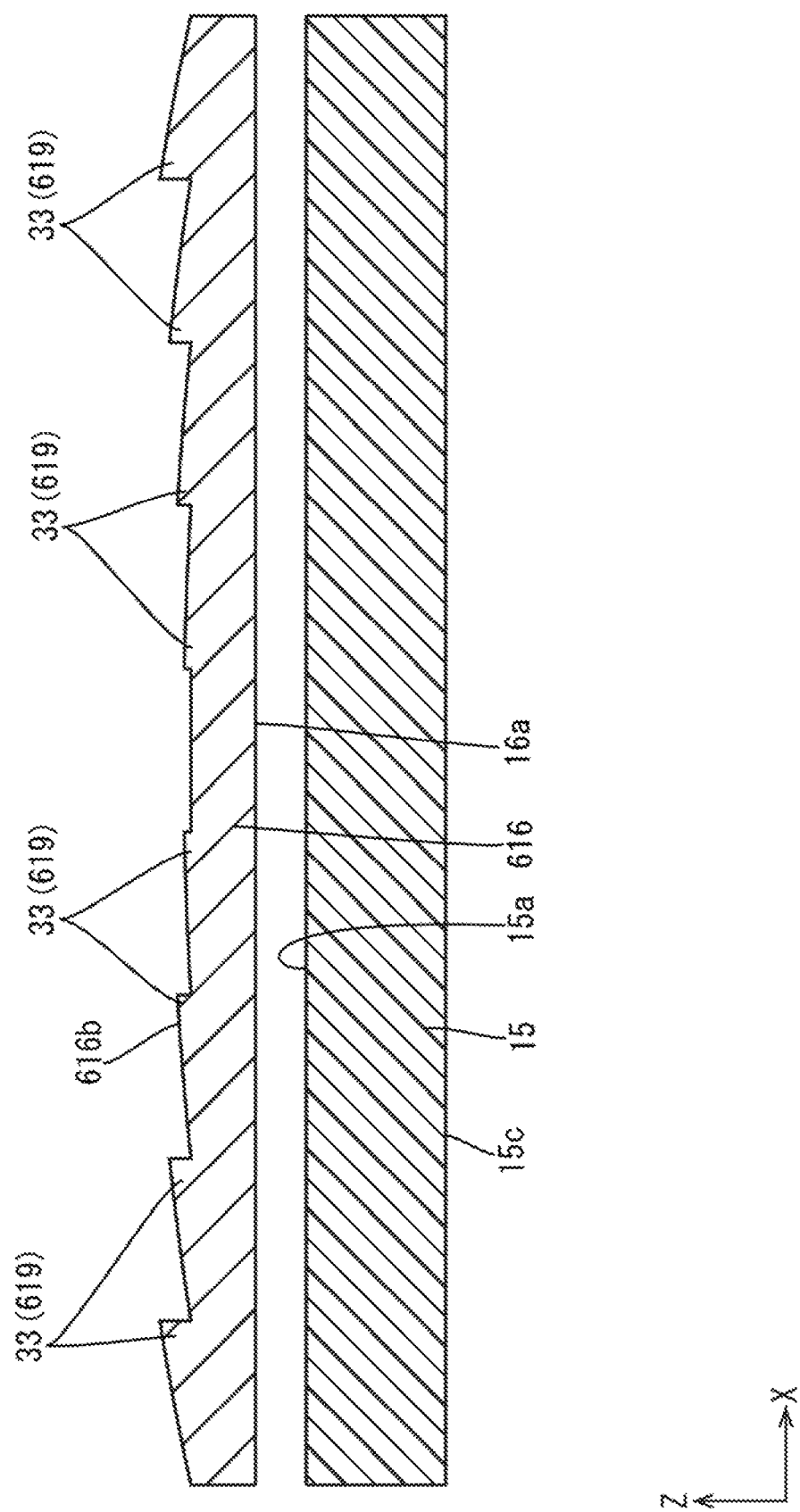

DISPLAY DEVICE INCLUDING OPTICAL MEMBER INCLUDING LIGHT REFRACTING PORTION AND HEAD-MOUNTED DISPLAY INCLUDING THE SAME

TECHNICAL FIELD

The present invention relates to a display device and a head-mounted display.

BACKGROUND ART

An example of a known liquid crystal display device is described in Patent Document 1. An eyeball projection type video display device described in Patent Document 1 includes a LCD displaying images and including pixels that are arranged two-dimensionally, a plate-like lighting means lighting each of the pixels of the LCD and including minute light emitting points that are arranged two-dimensionally, and an ocular optical system including an array of micro lenses that are arranged two-dimensionally corresponding with each of the pixels of the LCD and guide emitted luminous flux from respective pixels on eyeballs.

RELATED ART DOCUMENT

Patent Document 1: Japanese Unexamined Patent Application Publication No. 10-170860

Problem to be Solved by the Invention

However, in the eyeball projection type video display device described in Patent Document 1, the plate-like lighting means lighting the LCD includes a light guide plate and a diffusion hole sheet covering a light exit surface of the light guide plate and having minute diffusion holes through which light passes. Thus the plate-like lighting means has such a specific structure. In addition to the plate-like lighting means, the display device requires a lighting side micro-lens array (MLA) and an eyepiece side micro-lens array (MLA). Therefore, a producing cost and the number of parts are increased and productivity is poor.

DISCLOSURE OF THE PRESENT INVENTION

An object of the present invention is to reduce a cost and improve productivity while reducing power consumption and improving display quality.

Means for Solving the Problem

A display device according to the present invention includes a display panel, a lighting device supplying light to the display panel, a light source included in the lighting device, an optical member included in the lighting device and disposed opposite the display panel and having a light exit surface through which light from the light source exits toward the display panel, and a light refracting portion included in the optical member and applying an anisotropic refracting action to at least light rays exiting an edge portion of the light exit surface to be directed to a middle section of the display panel.

According to such a configuration, images appear on the display panel with using the light exiting the lighting device. The lighting device includes the light source and the optical member. The light rays exit the optical member that is opposite the display panel through the light exit surface toward the display panel and are refracted by the light refracting portion. The light refracting portion applies the anisotropic refracting action to the light rays exiting through at least the edge portion of the light exit surface to be directed toward the middle section of the display panel. Therefore, the light rays exiting through the edge portion of the light exit surface can be effectively used for displaying images on the display panel, and the display quality is improved. The optical member including the light refracting portion is included in the lighting device. Therefore, another part separately from the lighting device is not necessary to be prepared and the manufacturing cost and the number of the parts are reduced and the productivity is improved. The term "opposite" means that two flat-shaped objects face each other and the two facing surfaces have substantially a same shape and a same area and face parallel to each other.

Preferable embodiments of the present invention may include the following configurations.

(1) The light refracting portion may be configured such that the anisotropic refracting action applied to the light rays exiting is stronger as is closer to the edge portion from a middle section of the light exit surface. Accordingly, the anisotropic refracting action applied to the light rays exiting the optical member varies according to the position on the light exit surface through which the light rays exit so that the light use efficiency is further improved.

(2) The light refracting portion may apply an isotropic refracting action to light rays exiting through a middle section of the light exit surface. Accordingly, the anisotropic refracting action is not applied to but the isotropic refracting action is applied to the light rays exiting through the middle section of the light exit surface of the optical member, and the light rays are refracted in an isotropic manner. Therefore, the brightness distribution on the display panel is further improved.

(3) The optical member may at least include a light guide plate having a plate shape having an edge surface as a light entering surface through which the light from the light source enters and a plate surface as the light exit surface. According to such a configuration, the light rays emitted by the light source and entering through the light entering surface travel within the light guide plate and exit through the light exit surface. The anisotropic refracting action is applied to the light rays exiting at least through the edge portion of the light exit surface of the light guide plate such that the light rays are directed toward the middle section of the display panel by the light refracting portion. Thus, the light use efficiency is improved.

(4) The light refracting portion may include prism portions on the light exit surface of the light guide plate, the prism portions may extend in a normal direction of the light entering surface and may be arranged in a perpendicular direction perpendicular to the normal direction, and each of the prism portions may include a top portion and a pair of sloped surfaces having the top portion therebetween, and the prism portions may at least include a top portion off-centered prism portion in the edge portion of the light exit surface with respect to the perpendicular direction, the top portion off-centered prism portion may have the top portion off-centered to a middle section of the light exit surface with respect to the perpendicular direction. According to such a configuration, the prism portions extending in the normal direction of the light entering surface on the light exit surface of the light guide plate and arranged in the perpendicular direction perpendicular to the normal direction apply the refracting actions to the light rays as follows. The light rays are refracted by the sloped surface that is on the middle side of the light exit surface with respect to the top portion in the perpendicular direction to be directed toward the edge portion of the display panel. The light rays are refracted by the sloped surface that is on the edge side of the light exit surface with respect to the top portion in the perpendicular direction to be directed toward the middle section of the display panel. The top portion off-centered prism portion of the prism portions is included at the edge portion of the light exit surface of the light guide plate with respect to the perpendicular direction. In such a top portion off-centered prism portion, the sloped surface that is on the edge side of the light exit surface with respect to the top portion in the perpendicular direction has an area larger than that of the sloped surface that is on the middle section side of the light exit surface with respect to the top portion in the perpendicular direction. According to such a configuration, the light rays refracted by the top portion off-centered prism portion include a great amount of light rays directed toward the middle section of the display panel. Therefore, light use efficiency is improved.

(5) The light guide plate may have a plate surface opposite from the light exit surface as an opposite surface, the light refracting portion may include microprism portions on the opposite surface in a normal direction of the light entering surface, the microprism portions may be arranged in a perpendicular direction perpendicular to the normal direction, and each of the microprism portions may have a top portion and a pair of sloped surfaces having the top portion therebetween, one of the sloped surfaces may be on a light source side and another one may be on an opposite side from the light source side with respect to the normal direction. The microprism portions may include a top portion off-centered microprism portion and an inclined microprism portion, and the top portion off-centered microprism portion may be included in an edge portion of the opposite surface with respect to the normal direction and include the top portion that is off-centered to a middle section of the opposite surface with respect to the normal direction, and the inclined microprism portion may be included in an edge portion of the opposite surface with respect to the perpendicular direction and the sloped surface of the inclined microprism portion on the light source side with respect to the top portion may be inclined with respect to the light entering surface so as to face the middle section of the opposite section of the opposite surface with respect to the perpendicular direction. According to such a configuration, the microprism portions that are arranged in the normal direction of the light entering surface and the perpendicular direction perpendicular to the normal direction on the opposite surface of the light guide plate apply the refracting action to light mainly with the sloped surfaces on the light source side with respect to the top portion. Among the microprism portions, the top portion off-centered microprism portions on the edge side of the opposite surface of the light guide plate with respect to the normal direction have the top portions that are off-centered toward the middle section of the opposite surface in the normal direction. According to such a configuration, if the light is refracted by the sloped surfaces on the light source side with respect to the respective top portions, the exiting light is directed toward the middle section of the display panel with respect to the normal direction. Among the microprism portions, the inclined microprism portions that are included in the edge portion with respect to the perpendicular direction on the opposite surface of the light guide plate have the sloped surfaces on the light source side with respect to the top portions and the sloped surfaces are inclined with respect to the light entering surface so as to face the middle section of the opposite surface with respect to the perpendicular direction. According to such a configuration, if the light is refracted by the sloped surfaces on the light source side with respect to the respective top portions, the exiting light is directed toward the middle section of the display panel with respect to the perpendicular direction. The light rays refracted by the top portion off-centered microprism portions and the inclined microprism portions include a great amount of light rays directed toward the middle section of the display panel. Therefore, light use efficiency is improved.

(6) The optical member may at least includes a light guide plate and an optical sheet that is on a display panel side with respect to the light guide plate and has a plate surface facing the display panel as the light exit surface, and the light refracting portion may be included at least in the optical sheet. According to such a configuration, the light rays emitted by the light source and entering the light guide plate travel within the light guide plate and exit the light guide plate and enter the optical sheet. The light rays to which the optical action is applied by the optical sheet exit through the light exit surface of the optical sheet toward the display panel. The anisotropic refracting action is applied to the light rays exiting through the edge portion of the light exit surface of the optical sheet such that the light rays are directed toward the middle section of the display panel by the light refracting portion. Thus, the light use efficiency is improved.

(7) The light guide plate may have an edge surface as a light guide plate light entering surface through which the light from the light source enters, the optical sheet may have a plate surface facing the light guide plate as a light entering surface, the light refracting portion may include prism portions on the light entering surface of the optical sheet, the prism portions may extend in a perpendicular direction perpendicular to a normal direction of the light guide plate light entering surface and may be arranged in the normal direction, and each of the prism portions may include a top portion and a pair of sloped surfaces having the top portion therebetween. The prism portions may at least include a top portion off-centered prism portion in an edge portion of the light entering surface with respect to the normal direction, the top portion off-centered prism portion may have the top portion off-centered to the edge portion of the light entering surface with respect to the normal direction. According to such a configuration, the prism portions extending in the perpendicular direction perpendicular to the normal direction of the light guide plate light entering surface on the light entering surface of the optical sheet and arranged in the normal direction apply the refracting actions to the light rays at the sloped surfaces that are on the opposite side from the light source side with respect to the respective top portions in the normal direction. The top portion off-centered optical sheet prism portions of the prism portions are included in the edge portion of the light entering surface of the optical sheet with respect to the normal direction. Thus, the top portion off-centered optical sheet prism portions include the respective top portions off-centered toward the edge of the light entering surface of the optical sheet with respect to the normal direction. According to such a configuration, the top portion off-centered optical sheet prism portions apply the anisotropic refracting action to the light such that the exiting light rays are directed toward the middle section of the display panel.

(8) The light refracting portion may include a spherical lens included on the light exit surface of the optical sheet, and the spherical lens may have a curvature that is constant within a plane surface or is relatively smaller at a peripheral edge than a center of the light exit surface. Accordingly, the spherical lens included on the light exit surface of the optical sheet has a curvature relatively smaller at the peripheral edge portion than the center portion of the light exit surface. With such a configuration, components of astigmatism can be removed. Accordingly, the light use efficiency is further improved and a cost for producing the optical sheet is reduced compared to a configuration including a lens having other complicated structure.

(9) The light refracting portion may include a Fresnel lens included on the light exit surface of the optical sheet, and the Fresnel lens may have a curvature that is constant within a plane surface or is relatively smaller at a peripheral edge than a center of the light exit surface. The Fresnel lens included on the light exit surface of the optical sheet has a curvature relatively smaller at the peripheral edge portion than the center portion of the light exit surface. With the Fresnel lens having such a configuration, components of astigmatism can be removed. Accordingly, the light use efficiency is further improved and the optical sheet can be thinner.

(10) The light refracting portion may include a cylindrical lens included on the light exit surface of the optical sheet, and the cylindrical lens may have a curvature that is constant within a plane surface or is relatively smaller at an edge than a middle of the light exit surface. The Fresnel lens included on the light exit surface of the optical sheet has a curvature relatively smaller at the peripheral edge portion than the center portion of the light exit surface. With the cylindrical lens having such a configuration, components of astigmatism can be removed. Accordingly, the light use efficiency is further improved and a cost for producing the optical sheet is reduced compared to a configuration including a lens having other complicated structure.

(11) The light refracting portion may include a linear Fresnel lens included on the light exit surface of the optical sheet, and the linear Fresnel lens may have a curvature that is constant within a plane surface or is relatively smaller at an edge than a middle of the light exit surface. The linear Fresnel lens included on the light exit surface of the optical sheet has a curvature relatively smaller at the peripheral edge portion than the center portion of the light exit surface. With the linear Fresnel lens having such a configuration, components of astigmatism can be removed. Accordingly, the light use efficiency is further improved and the optical sheet can be thinner.

Next, to solve the above problems, a head-mounted display of the present invention at least includes the above-described display device, a lens through which an image displayed on the display device is formed on a user's eye, and a head mounting device including the display device and the lens and mounted on a user's head. According to the head-mounted display of such a configuration, if the user uses the head mounting device mounted on the head, the image displayed on the display device is formed on the user's eyeball EY through the lens and the user can see the image displayed on the display device as a magnified image. The anisotropic refracting action is applied to the light rays exiting through the edge portion of the light exit surface of the optical member and included in the lighting device of the display device. Accordingly, the light rays receiving the anisotropic refracting action are directed toward the middle section of the display panel by the light refracting portion. Therefore, the light rays effectively reach the eyeballs EY of the user who sees the image displayed on the display panel as a magnified image. Accordingly, the high display quality is obtained and a producing cost of the head mounted display is reduced and productivity of the head mounted display is improved.

Advantageous Effect of the Invention

According to the present invention, a cost is reduced and productivity is improved.

BRIEF DESCRIPTION OF THE DRAWINGS

FIG. 18 is a cross-sectional view of the backlight device taken along a short-side direction thereof.

MODES FOR CARRYING OUT THE INVENTION

First Embodiment

Figure 1:
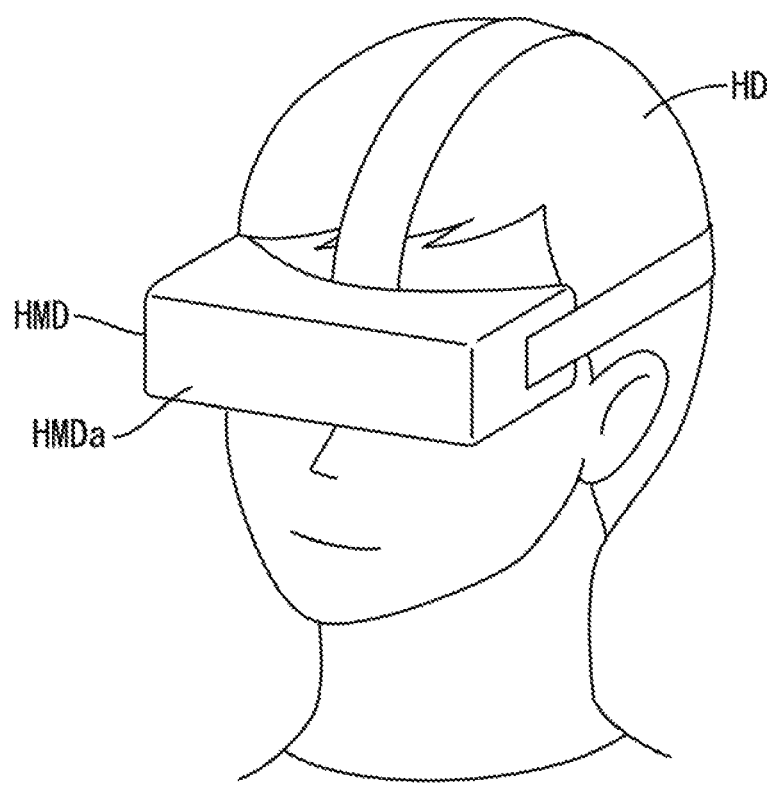
FIG. 1 is a general perspective view illustrating a head-mounted display according to a first embodiment of the present invention that is mounted on a head of a user.

A first embodiment of the present technology will be described with reference to FIGS. 1 to 6. In this embodiment section, a goggle-type head-mounted display (HMD) HMD and a liquid crystal display device (display device) 10 used therein will be described as an example. X-axis, Y-axis and Z-axis may be present in the drawings and each of the axial directions represents a direction represented in each drawing.

Figure 2:
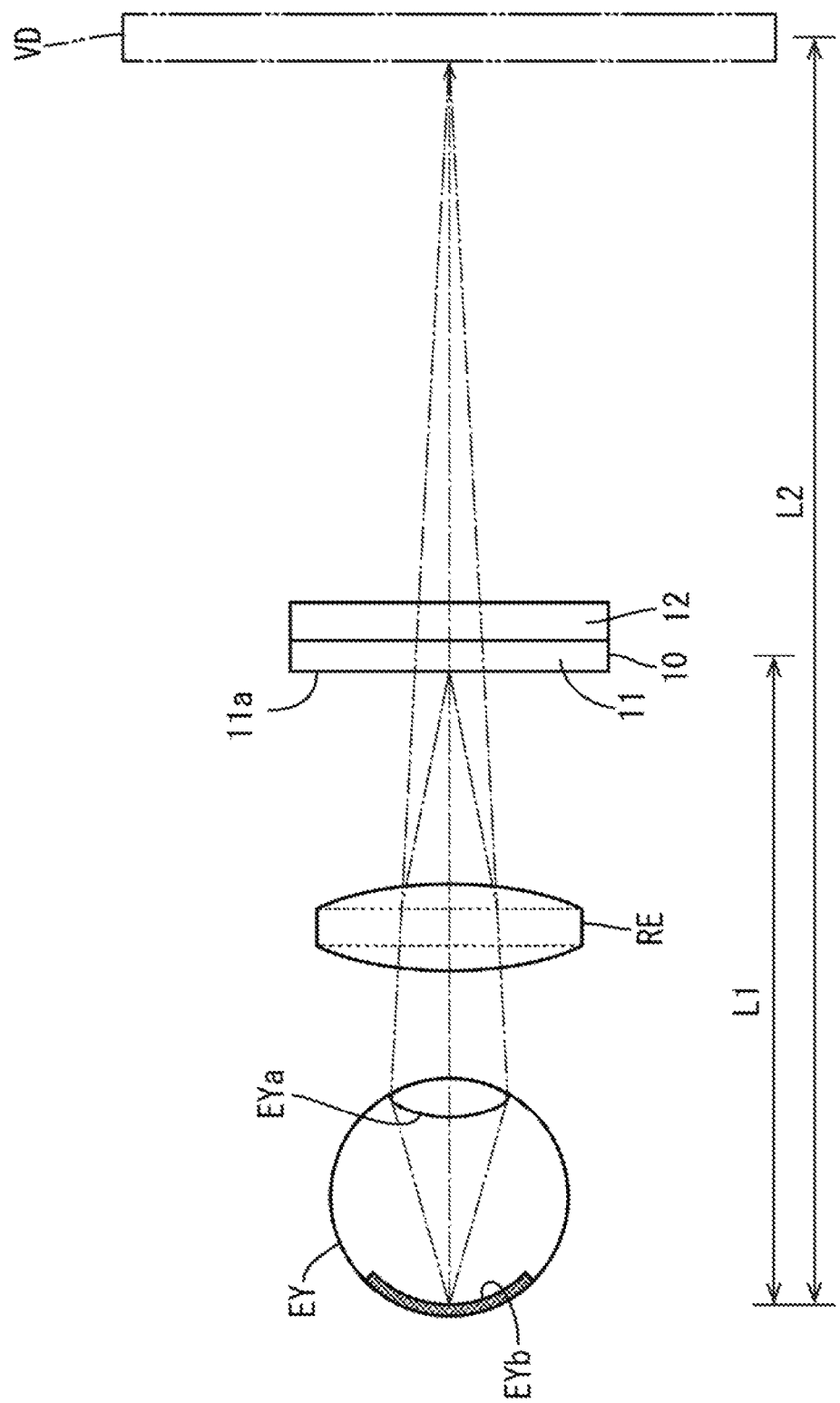
FIG. 2 is a general side view illustrating a liquid crystal panel and a lens included in a head mounting device of the head-mounted display and an eyeball of the user and illustrating an optical relation thereof.

As illustrated in FIG. 1, the goggle-type head-mounted display HMD includes a head mounting device HMDa that is mounted on a head HD of a user to surround two eyes of the user. As illustrated in FIG. 2, the head mounting device HMDa at least includes a built-in liquid crystal display device 10 displaying images thereon and a built-in lens RE with which the images displayed on the liquid crystal display device 10 are formed (imaging) on eyeballs (eyes) EY of the user. The liquid crystal display device 10 at least includes a liquid crystal panel (a display panel) 11 and a backlight device (a lighting device) 12 providing light to the liquid crystal panel 11. The lens RE is disposed between the liquid crystal display device 10 and the eyeballs EY of the user and makes the light rays transmitting therethrough to be refracted. By adjusting a focal distance of the lens RE, images formed on the retina (eye) EYb through the crystalline lens EYa of the eyeball EY are seen by a user as if the images are displayed on a virtual display VD that is present in appearance at a position away from the eyeball EY by a distance L2 that is much greater than an actual distance L1 from the eyeball EY to the liquid crystal display device 10. Accordingly, the user sees a magnified image (a virtual image) displayed on the virtual display VD having a screen size (for example, from dozens of inches to several hundred inches) much greater than the screen size (for example, from several numbers of 0.1 inches to several inches) of the liquid crystal display device 10. One liquid crystal display device 10 may be mounted in the head mounting device HMDa and images for a right eye and images for a left eye may be displayed on the liquid crystal display device 10. Two liquid crystal display devices 10 may be mounted in the head mounting device HMDa and images for a right eye may be displayed on one liquid crystal display device 10 and images for a left eye may be displayed on another liquid crystal display device 10. The head mounting device HMDa may include the above-described external light source and earphone that is put on user's ears and through which sounds are output.

The liquid crystal panel 11 and the backlight device 12 included in the liquid crystal display device 10 will be described in detail. As illustrated in FIG. 2, the liquid crystal panel 11 has a rectangular plate shape as a whole and has a plate surface opposite the lens RE as a display surface 11a on which images are displayed. The liquid crystal panel 11 at least includes a pair of glass substrates that are bonded to each other while having a certain gap therebetween and a liquid crystal layer between the substrates. The liquid crystal layer includes liquid crystal molecules having optical characteristics that vary according to application of electric field. On one of the glass substrates (an array board, an active matrix board), switching components (such as TFTs) connected to source lines and gate lines that are perpendicular to each other, and pixel electrodes each arranged in a rectangular section surrounded by the source lines and the gate lines and connected to the switching component are arranged in a matrix, and an alignment film is disposed. On the other one of the glass substrates (a counter board, a CF board), color filters including three color portions of red (R), green (G), and blue (B) that are arranged in a matrix with certain arrangement, a light blocking layer (a black matrix) disposed between the color portions and formed in a grid, a counter electrode opposite the pixel electrodes and disposed in a solid pattern, and an alignment film are disposed.

Figure 3:
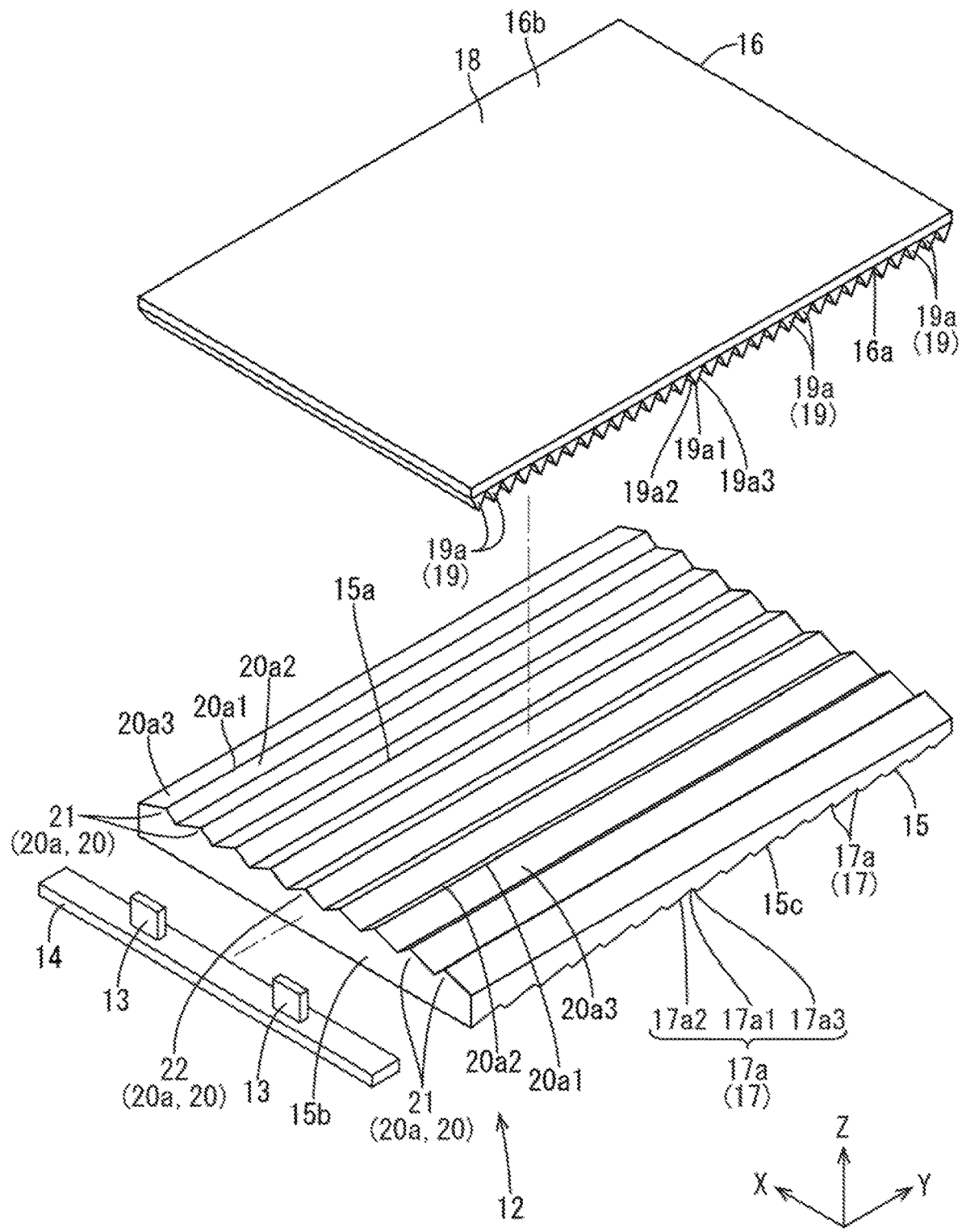
FIG. 3 is an exploded perspective view illustrating a backlight device included in the liquid crystal display device.

Next, the backlight device 12 will be described. As illustrated in FIG. 3, the backlight device 12 at least includes LEDs (a light source) 13, an LED board (a light source board) 14 on which the LEDs 13 are mounted, a light guide plate (an optical member) 15 that guides light from the LEDs 13, an optical sheet (an optical member) 16 that is disposed between the light guide plate 15 and the liquid crystal panel 11. The backlight device 12 is an edge-light type (a side-light type) in which light from the LEDs 13 enters the light guide plate 15 through one side surface thereof.

As illustrated in FIG. 3, the LEDs 13 are mounted on a base board that is fixed on the LED board 14 and the LEDs 13 are configured by enclosing LED chips with resin material on the base board. The LED chips of the LEDs 13 emit single blue light. Phosphors (yellow phosphors, green phosphors, and red phosphors) are dispersed in the resin material with which the LED chips are enclosed and the LEDs 13 emit substantially white light as a whole. The LEDs 13 are side-surface emitting type in which side surfaces of the LEDs 13 are light emitting surfaces 13a. The light emitting surfaces 13a of the LEDs 13 are next to the mounting surfaces that are mounted on the LED board 14. The LED board 14 is arranged such that a plate surface thereof is parallel to a plate surface of the light guide plate 15 and a front side plate surface of the LED board 14 is an LED mounting surface on which the LEDs 13 (two LEDs 13 in FIG. 3) are mounted.

Figure 4:
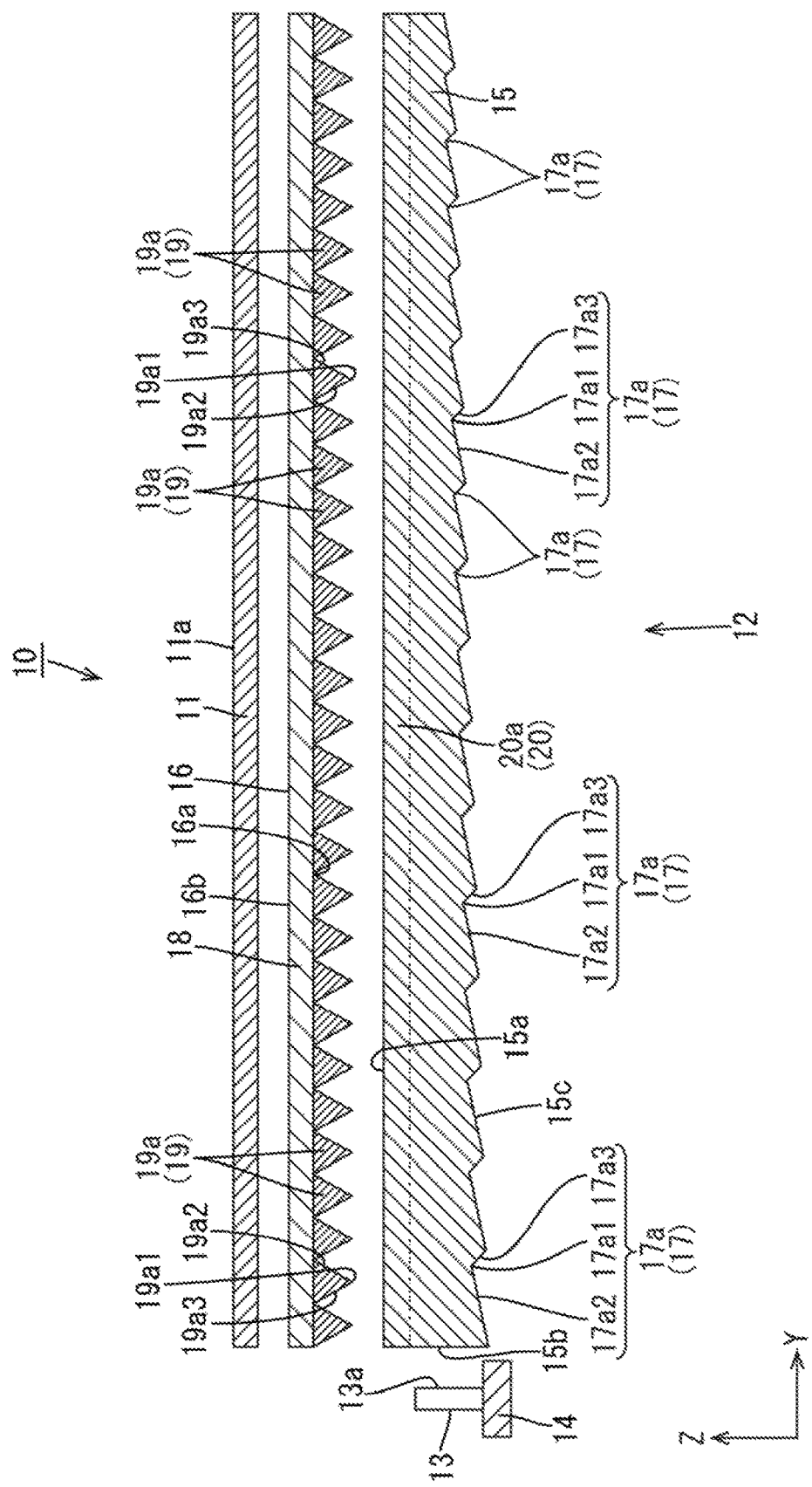
FIG. 4 is a cross-sectional view of the liquid crystal display device taken along a long-side direction thereof.

The light guide plate 15 is made of synthetic resin that is substantially transparent (acrylic resin such as PMMA). As illustrated in FIG. 3, the light guide plate 15 is a flat plate shape and a plate surface thereof is parallel to a plate surface (a display surface 11a) of the liquid crystal panel 11. In the light guide plate 15, a long-side direction and a short-side direction of the plate surface of the light guide plate 15 match the Y-axis direction and the X-axis direction, respectively. A plate thickness direction perpendicular to the plate surface matches the Z-axis direction. The light guide plate 15 has a pair of plate surfaces and one of the plate surfaces facing the liquid crystal panel 11 and the optical sheet 16 is a light guide plate light exit surface 15a through which light rays travelling within the light guide plate 15 exit. As illustrated in FIG. 4, the light guide plate 15 is arranged directly below the liquid crystal panel 11 and the optical sheet 16. Among outer peripheral edge surfaces of the light guide plate 15, one of short-side edge surfaces is opposite the light emitting surfaces 13a of the LEDs 13 and is a light guide plate light entering surface 15b through which light from the LEDs through the light emitting surfaces 13a enters. The light emitted by the LEDs 13 in the X-axis direction (an arrangement direction in which the LEDs 13 and the light guide plate 15 are arranged) toward the light guide plate 15 enters the light guide plate 15 through the light guide plate light entering surface 15b, and after the light travels within the light guide plate 15, the light is directed in the Z-axis direction (an arrangement direction in which the liquid crystal panel 11, the optical sheet 16 and the light guide plate 15 are arranged) toward the optical sheet 16 (the front side, the light exit side) and exits the light guide plate through the plate surface. The light guide plate 15 has a substantially wedge-shaped cross sectional shape such that a thickness is decreased as it extends farther away from the light guide plate light entering surface 15b with respect to the Y-axis direction. A normal direction of the light guide plate light entering surface 15b matches the Y-axis direction and a perpendicular direction perpendicular to the normal line of the light guide plate light entering surface 15b matches the X-axis direction.

As illustrated in FIG. 4, the light guide plate 15 includes an exit light reflection portion 17 on another one of the pair of plate surfaces that is an opposite surface 15c opposite from the light guide plate light exit surface 15a. The exit light reflection portion 17 reflects the light rays travelling within the light guide plate 15 and accelerates the light rays to exit through the light guide plate light exit surface 15a. The exit light reflection portion 17 extends in the X-axis direction on the opposite surface 15c of the light guide plate 15. The exit light reflection portion 17 includes unit reflection portions (prisms) 17a that are arranged in the Y-axis direction at intervals (arrangement with intervals). Each of the unit reflection portions 17a has a recessed shape having a substantially triangular cross-sectional shape. Each of the unit reflection portions 17a includes a top portion 17a1, a first sloped surface (a main reflection surface, a light source side sloped surface) 17a2 and a second sloped surface (a re-entry surface, non-light source side sloped surface) 17a3. The first sloped surface 17a2 is on the LED 13 side (the light guide plate light entering surface 15b side) with respect to the top portion 17a1 and the Y-axis direction. The second sloped surface 17a3 is on an opposite side from the LED 13 side with respect to the top portion 17a1 and the Y-axis direction. The first sloped surface 17a2 is an upslope surface that gradually approaches the light guide plate light exit surface 15a as it extends toward the opposite side from the LED 13 side with respect to the Y-axis direction. The second sloped surface 17a3 is a downslope surface that is gradually farther away from the light guide plate light exit surface 15a as it extends toward the opposite side from the LED 13 side with respect to the Y-axis direction. The first sloped surfaces 17a2 of the unit reflection portions 17a reflect the light to generate light rays having an angle of incident on the light guide plate light exit surface 15a that is not greater than the critical angle. Thus, the unit reflection portions 17a accelerate the light rays to exit through the light guide plate light exit surface 15a. If the light rays having an angle of incident on the first sloped surface 17a2 that is not greater than the critical angle transmit through the first sloped surfaces 17a2, the transmitted light rays re-enter the light guide plate 15 through the second sloped surfaces 17a3. As is not illustrated, a reflection sheet is preferably disposed to cover the opposite surface 15c of the light guide plate 15 to increase light use efficiency.

As illustrated in FIG. 3, the optical sheet 16 has a sheet-like shape and a plate surface that is parallel to the plate surfaces of the liquid crystal panel 11 and the light guide plate 15. The optical sheet 16 is disposed on the light guide plate 15 on the front side (the light exit side) with respect to the light guide plate light exit surface 15a. The optical sheet 16 applies a certain optical action (an anisotropic light collecting action) to the light rays exiting through the light guide plate light exit surface 15a. The optical sheet 16 has a pair of front and rear plate surfaces and the rear plate surface that is opposite the light guide plate 15 is an optical sheet light entering surface 16a through which light from the light guide plate 15 enters and the front plate surface that is opposite the liquid crystal panel 11 is an optical sheet light exit surface 16b through which the light exits toward the liquid crystal panel 11. The optical sheet 16 includes a base member 18 that is made of substantially transparent synthetic resin and an optical sheet side light collecting portion 19 that is disposed on a rear surface of the base member 18, that is, on the optical sheet light entering surface 16a and applies the light collecting action to the entering light rays.

As illustrated in FIG. 4, the optical sheet side light collecting portion 19 includes optical sheet prism portions 19a that project from the optical sheet light entering surface 16a toward the rear side (the light guide plate 15 side) in the Z-axis direction. Each of the optical sheet prism portions 19a has substantially a triangular cross-sectional shape (a mountain shape) taken in the Y-axis direction (the normal direction of the light guide plate light entering surface 15b) and extends linearly in the X-axis direction (the perpendicular direction perpendicular to the normal direction of the light guide plate light entering surface 15b). The optical sheet prism portions 19a are arranged on the optical sheet light entering surface 16a in the Y-axis direction. Each of the optical sheet prism portions 19a has substantially an isosceles triangular cross-sectional shape and includes a pair of sloped surfaces 19a2, 19a3 having a top portion 19a1 therebetween. When light enters the optical sheet prism portions 19a having the above configuration from the light guide plate 15 side, the light entering the optical sheet prism portions 19a is refracted at a border surface between the external air layer and each of the sloped surfaces 19a2, 19a3 and directed in the front direction (a normal direction of the optical sheet light exit surface 16b). Such a light collecting action acts on the light rays that enter the optical sheet prism portions 19a in the Y-axis direction and is less likely to act on the light rays that enter the optical sheet prism portions 19a in the X-axis direction that is perpendicular to the Y-axis direction. In the optical sheet side light collecting portion 19 according to this embodiment, the Y-axis direction in which the optical sheet prism portions 19a are arranged is a light collecting direction in which the light collecting action is applied to the light, and the X-axis direction in which each of the optical sheet prism portions 19a extends is a non-light collecting direction in which the light collecting action is less likely to be applied to the light. Thus, the optical sheet side light collecting portion 19 according to this embodiment has anisotropic light collecting properties.

Figure 5:
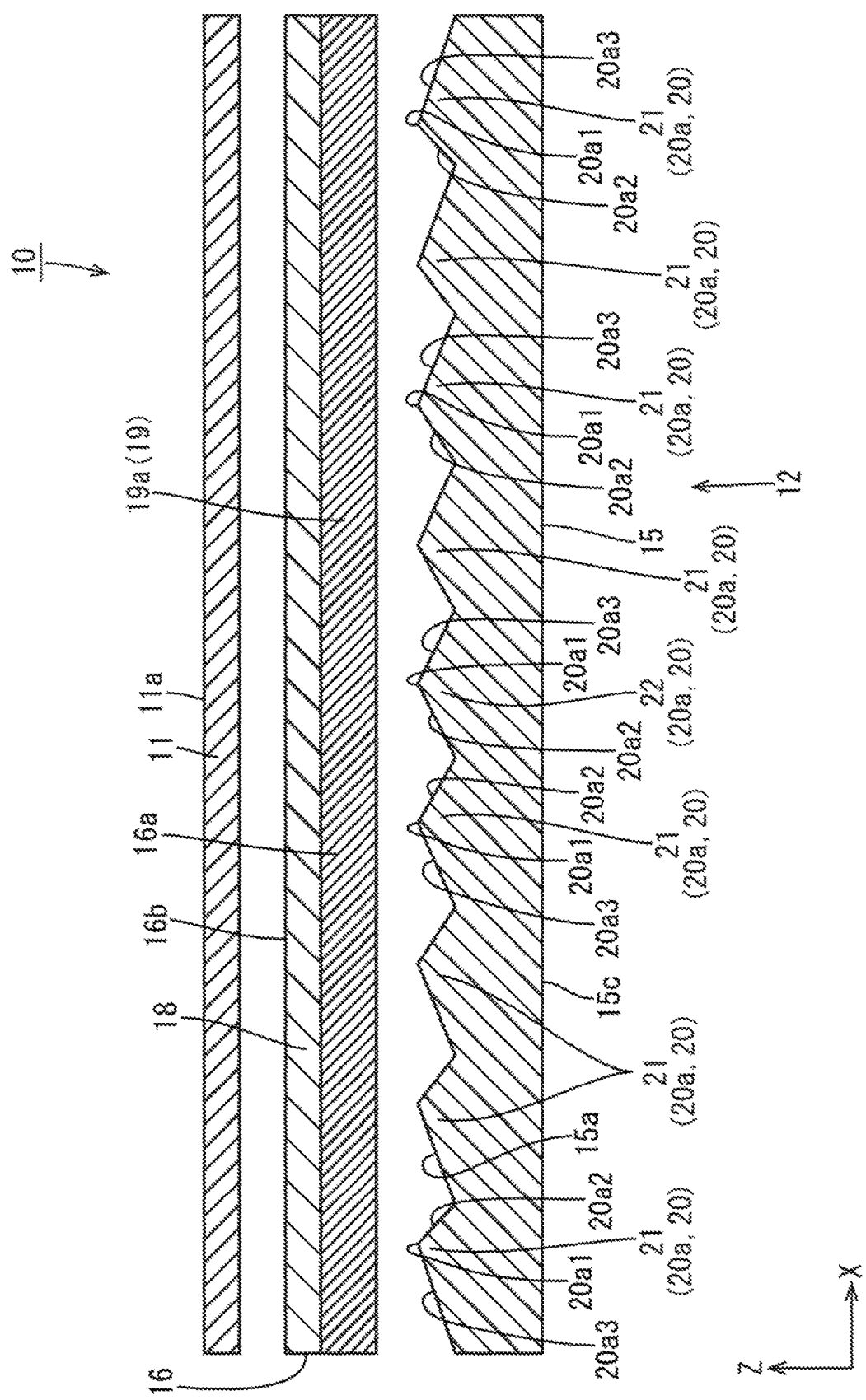
FIG. 5 is a cross-sectional view of the liquid crystal display device taken along a short-side direction thereof.

As illustrated in FIGS. 3 and 5, the light guide plate 15 includes a light guide plate side light collecting portion (a light refracting portion) 20 on the light guide plate light exit surface 15a. The light guide plate side light collecting portion 20 applies a light collecting action to exiting light rays. The light guide plate side light collecting portion 20 includes light guide plate prism portions (prisms) 20a that project from the light guide plate light exit surface 15a toward the front side (the optical sheet 16 side) in the Z-axis direction. Each of the light guide plate prism portions 20a has substantially a triangular cross-sectional shape (a mountain shape) taken in the X-axis direction (the perpendicular direction perpendicular to the normal direction of the light guide plate light entering surface 15b) and extends linearly in the Y-axis direction (the normal direction of the light guide plate light entering surface 15b). The light guide plate prism portions 20a are arranged on the light guide plate light exit surface 15a in the X-axis direction. Each of the light guide plate prism portions 20a has substantially a triangular cross-sectional shape and includes a pair of sloped surfaces 20a2, 20a3 having a top portion 20a1 therebetween. According to the light guide plate prism portions 20a having such a configuration, when light travelling within the light guide plate 15 exits the light guide plate 15, the light exiting the light guide plate 15 is refracted at a border surface between the external air layer and each of the sloped surfaces 20a2, 20a3 of the light guide plate prism portions 20a and directed in the substantially front direction (a normal direction of the light guide plate light exit surface 15a). Such a light collecting action acts on the light rays that enter the light guide plate prism portions 20a in the X-axis direction and is less likely to act on the light rays that enter the light guide plate prism portions 20a in the Y-axis direction that is perpendicular to the X-axis direction. In the light guide plate side light collecting portion 20 according to this embodiment, the X-axis direction (the non-light collecting direction of the optical sheet side light collecting portion 19) in which the light guide plate prism portions 20a are arranged is a light collecting direction in which the light collecting action is applied to the light, and the Y-axis direction (the light collecting direction of the optical sheet side light collecting portion 19) in which each of the light guide plate prism portions 20a extends is a non-light collecting direction in which the light collecting action is less likely to be applied to the light. Thus, the light guide plate side light collecting portion 20 according to this embodiment has anisotropic light collecting properties in which the light collecting direction and the non-light collecting direction are perpendicular to those of the optical sheet side light collecting portion 19.

As illustrated in FIG. 5, the light guide plate prism portions 20a includes a top portion off-centered light guide plate prism portion (a top portion off-centered prism portion) 21 and a top portion non-off-centered prism portion (a top portion non-off-centered prism portion) 22. The top portion off-centered light guide plate prism portion 21 includes the top portion 20a1 that is off-centered with respect to the X-axis direction (the perpendicular direction), and the top portion non-off-centered light guide plate prism portion 22 includes the top portion 20a1 that is not off-centered with respect to the X-axis direction. The top portion non-off-centered light guide plate prism portion 22 is included in a middle section of the light guide plate light exit surface 15a with respect to the X-axis direction. The top portion non-off-centered light guide plate prism portion 22 has substantially an isosceles triangular cross-sectional shape and includes the top portion 20a1 that is not off-centered with respect to the X-axis direction. A pair of sloped surfaces 20a2, 20a3 has a same area. The sloped surfaces 20a2, 20a3 of the top portion non-off-centered light guide plate prism portion 22 have a same inclination angle with respect to the X-axis direction. The sloped surfaces 20a2, 20a3 of the top portion non-off-centered light guide plate prism portion 22 have a same area and the amount of light rays refracted by each of the sloped surfaces 20a2, 20a3 is substantially same. The light rays exiting the light guide plate 15 through the middle section of the light guide plate light exit surface 15a with respect to the X-axis direction receive an isotropic refracting action and are refracted in an isotropic manner by the top portion non-off-centered light guide plate prism portion 22. Accordingly, brightness is effectively increased in the middle section of the liquid crystal display device 10 with respect to the X-axis direction.

Figure 6:
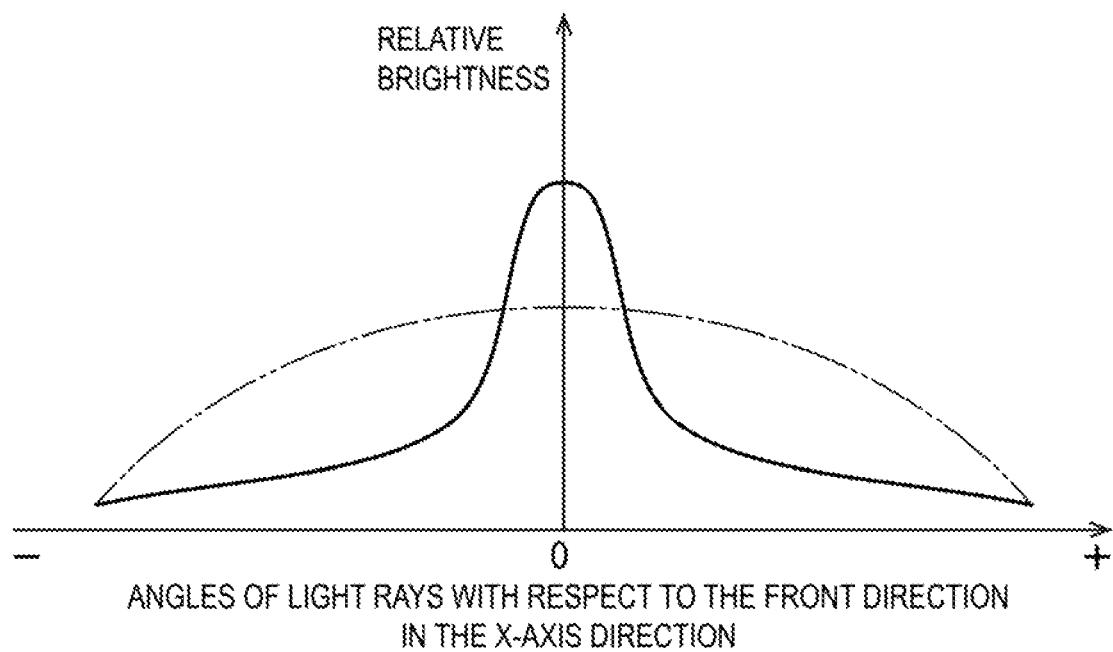
FIG. 6 is a graph describing a brightness angle distribution of exit light rays of the backlight device with respect to an X-axis direction.

Next, the top portion off-centered light guide plate prism portion 21 will be described in detail. As illustrated in FIG. 5, the top portion off-centered light guide plate prism portions 21 are included closer to edges of the light guide plate light exit surface 15a with respect to the X-axis direction than the top portion non-off-centered light guide plate prism portion 22 is. Each of the top portion off-centered light guide plate prism portions 21 includes the top portion 20a1 closer to the middle section of the light guide plate light exit surface 15a with respect to the X-axis direction. According to such a configuration, the top portion off-centered light guide plate prism portion 21 includes a pair of sloped surfaces 20a2, 20a3 and the second sloped surface 20a3 closer to the edge with respect to the X-axis direction (on the opposite side from the top portion non-off-centered light guide plate prism portion 22 side) has an area greater than that of the first sloped surface 20a2 closer to the middle section with respect to the X-axis direction (the top portion non-off-centered light guide plate prism portion 22 side). Difference between the areas of the first sloped surface 20a2 and the second sloped surface 20a3 of the top portion off-centered light guide plate prism portion 21 varies according to the position of the top portion off-centered light guide plate prism portion 21 on the light guide plate light exit surface 15a with respect to the X-axis direction. The difference is continuously increased as the position approaches the edge from the middle section with respect to the X-axis direction. The second sloped surface 20a3 of the top portion off-centered light guide plate prism portion 21 has an inclination angle with respect to the X-axis direction that Is smaller than the inclination angle of the first sloped surface 20a2. Difference between the inclination angles of the first sloped surface 20a2 and the second sloped surface 20a3 with respect to the X-axis direction is continuously and gradually increased as the position of the top portion off-centered light guide plate prism portion 21 on the light guide plate light exit surface 15a with respect to the X-axis direction is closer to the edge from the middle section. In the top portion off-centered light guide plate prism portion 21, the first sloped surface 20a2 closer to the middle section with respect to the X-axis direction applies a refracting action such that light rays exiting the light guide plate 15 are refracted by the first sloped surface 20a2 and directed toward the edge of the liquid crystal panel 11 with respect to the X-axis direction. The second sloped surface 20a3 closer to the edge with respect to the X-axis direction applies a refracting action such that light rays exiting the light guide plate 15 are refracted by the second sloped surface 20a3 and directed toward the middle section of the liquid crystal panel 11 with respect to the X-axis direction. Namely, the top portion off-centered light guide plate prism portion 21 applies an anisotropic refracting action to the light rays exiting the light guide plate 15. The second sloped surface 20a3 of the top portion off-centered light guide plate prism portion 21 has an area greater than that of the first sloped surface 20a2. Therefore, the amount of light rays that are refracted toward the middle section of the liquid crystal panel 11 is relatively increased. Namely, the light rays exiting the light guide plate 15 through the edge portion with respect to the X-axis direction include a large amount of light rays travelling toward the middle section of the liquid crystal panel 11 as illustrated in FIG. 6. FIG. 6 is a graph illustrating a brightness angle distribution of the light rays exiting the backlight device and the lateral axis represents angles of the light rays with respect to the front direction in the X-axis direction and the vertical axis represents relative brightness. In the above configuration, the greater amount of light rays are supplied to the middle section of the liquid crystal panel 11 than a configuration that the light rays exiting the middle section of the light guide plate and the light rays exiting the edge portion are refracted in an isotropic manner (a graph represented by a chain double dashed line in FIG. 6). Furthermore, an area ratio of the second sloped surface 20a3 of the top portion off-centered light guide plate prism portion 21 to the first sloped surface 20a2 is increased as the position of the top portion off-centered light guide plate prism portion 21 is closer to the edge portion from the middle section with respect to the X-axis direction. According to such a configuration, the top portion off-centered light guide plate prism portion 21 that is disposed in the edge portion with respect to the X-axis direction applies the anisotropic refracting action strongly to the exiting light rays and the light use efficiency is further improved. Accordingly, the light rays supplied from the backlight device 12 to be used for displaying images on the display surface 11a of the liquid crystal panel 11 reach the eyeballs EY of the user of the head mounted display HMD more effectively and the display quality is improved.

As described above, the liquid crystal display device (the display device) 10 according to this embodiment includes the liquid crystal panel (the display panel) 11, the backlight device (the lighting device) 12 supplying light to the liquid crystal panel 11, the LEDs (the light source) 13 that are included in the backlight device 12, the light guide plate 15 that is included in the backlight device 12 and has a light guide plate light exit surface (the light exit surface) 15a opposite the liquid crystal panel 11 and through which the light from the LEDs 13 exits toward the liquid crystal panel 11, and the light guide plate side light collecting portion 20 included in the light guide plate 15, which is the optical member. The light guide plate side light collecting portion 20 is the light refracting portion that applies the anisotropic refracting action to the light rays exiting at least the edge portion of the light guide plate light exit surface 15a to be directed to the middle section of the liquid crystal panel 11.

According to such a configuration, images appear on the liquid crystal panel 11 with using the light exiting the backlight device 12. The backlight device 12 includes the LEDs 13 and the light guide plate 15, which is the optical member. The light rays exiting the light guide plate 15, which is the optical member and opposite the liquid crystal panel 11, through the light guide plate light exit surface 15a toward the liquid crystal panel 11 are refracted by the light guide plate side light collecting portion 20, which is the light refracting portion. The light guide plate side light collecting portion 20, which is the light refracting portion, applies the anisotropic refracting action to the light rays exiting through at least the edge portion of the light guide plate light exit surface 15a to be directed toward the middle section of the liquid crystal panel 11. Therefore, the light rays exiting through the edge portion of the light guide plate light exit surface 15a can be effectively used for displaying images on the liquid crystal panel 11, and the display quality is improved. The light guide plate 15, which is the optical member, including the light guide plate side light collecting portion 20, which is the light refracting portion, is included in the backlight device 12. Therefore, another part separately from the backlight device is not necessary to be prepared and the manufacturing cost and the number of the parts are reduced and the productivity is improved. The term "opposite" means that two flat-shaped objects face each other and the two facing surfaces have substantially a same shape and a same area and face parallel to each other.

The light guide plate side light collecting portion 20, which is the light refracting portion, is configured to apply the anisotropic refracting action strongly to the exiting light rays as it is closer to the edge portion from the middle section of the light guide plate light exit surface 15a. Accordingly, the anisotropic refracting action applied to the light rays exiting the light guide plate 15, which is the optical member, varies according to the position on the light guide plate light exit surface 15a through which the light rays exit so that the light use efficiency is further improved.

The light guide plate side light collecting portion 20, which is the light refracting portion, applies an isotropic refracting action to the light rays exiting through the middle section of the light guide plate light exit surface 15a. Accordingly, the anisotropic refracting action is not applied to but the isotropic refracting action is applied to the light rays exiting through the middle section of the light guide plate light exit surface 15a of the light guide plate 15, which is the optical member, and the light rays are refracted in an isotropic manner. Therefore, the brightness distribution on the liquid crystal panel 11 is further improved.

The optical member at least includes the light guide plate 15 of a plate shape having the light guide plate light entering surface (a light entering surface) 15b on an edge surface and the light guide plate light exit surface 15a on a plate surface. The light rays from the LEDs 13 enter through the light guide plate light entering surface 15b. According to such a configuration, the light rays emitted by the LEDs 13 and entering through the light guide plate light entering surface 15b travel within the light guide plate 15 and exit through the light guide plate light exit surface 15a. The anisotropic refracting action is applied to the light rays exiting at least through the edge portion of the light guide plate light exit surface 15a of the light guide plate 15 such that the light rays are directed toward the middle section of the liquid crystal panel 11 by the light guide plate side light collecting portion 20. Thus, the light use efficiency is improved.

The light guide plate side light collecting portion 20, which is the light refracting portion, includes the light guide plate prism portions (prisms) 20a. The light guide plate prism portions 20a extends in the normal direction of the light guide plate light entering surface 15b on the light guide plate light exit surface 15a of the light guide plate 15 and are arranged in the perpendicular direction perpendicular to the normal direction Each of the light guide plate prism portions 20a includes the top portion 20a1 and a pair of sloped surfaces 20a2, 20a3 having the top portion 20a1 therebetween. The light guide plate prism portions 20a at least includes the top portion off-centered light guide plate prism portion (the top portion off-centered prism portion) 21. The top portion off-centered light guide plate prism portion 21 is included at the edge portion of the light guide plate light exit surface 15a with respect to the perpendicular direction and includes the top portion 20a1 off-centered with respect to the perpendicular direction and closer to the middle section of the light guide plate light exit surface 15a. According to such a configuration, the light guide plate prism portions 20a extending in the normal direction of the light guide plate light entering surface 15b on the light guide plate light exit surface 15a of the light guide plate 15 and arranged in the perpendicular direction perpendicular to the normal direction apply the refracting actions to the light rays as follows. The light rays are refracted by the second sloped surface 20a3 that is on the middle side of the light guide plate light exit surface 15a with respect to the top portion 20a1 in the perpendicular direction to be directed toward the edge portion of the liquid crystal panel 11. The light rays are refracted by the first sloped surface 20a2 that is on the edge side of the light guide plate light exit surface 15a with respect to the top portion 20a1 in the perpendicular direction to be directed toward the middle section of the liquid crystal panel 11. The top portion off-centered light guide plate prism portion 21 of the light guide plate prism portions 20a is included at the edge portion of the light guide plate light exit surface 15a of the light guide plate 15 with respect to the perpendicular direction. In such a top portion off-centered light guide plate prism portion 21, the first sloped surface 20a2 that is on the edge side of the light guide plate light exit surface 15a with respect to the top portion 20a1 in the perpendicular direction has an area larger than that of the second sloped surface 20a3 that is on the middle section side of the light guide plate light exit surface 15a with respect to the top portion 20a1 in the perpendicular direction. According to such a configuration, the light rays refracted by the top portion off-centered light guide plate prism portion 21 include a great amount of light rays directed toward the middle section of the liquid crystal panel 11. Therefore, light use efficiency is improved.

The head-mounted display HMD of this embodiment at least includes the above-described liquid crystal display device 10, the lens RE through which the image displayed on the liquid crystal display device 10 is formed on the eyeball (eye) EY of the user, and the head mounting device HMDa including the liquid crystal display device 10 and the lens RE and mounted on the user's head HD. According to the head-mounted display HMD of such a configuration, if the user uses the head mounting device HMDa mounted on the head HD, the image displayed on the liquid crystal display device 10 is formed on the user's eyeball EY through the lens RE and the user can see the image displayed on the liquid crystal display device 10 as a magnified image. The anisotropic refracting action is applied to the light rays exiting through the edge portion of the light guide plate light exit surface 15a of the light guide plate 15, which is the optical member and included in the backlight device 12 of the liquid crystal display device 10. Accordingly, the light rays receiving the anisotropic refracting action are directed toward the middle section of the liquid crystal panel 11 by the light guide plate side light collecting portion 20, which is the light refracting portion. Therefore, the light rays effectively reach the eyeballs EY of the user who sees the image displayed on the liquid crystal panel 11 as a magnified image. Accordingly, the high display quality is obtained and a producing cost of the head mounted display HMD is reduced and productivity of the head mounted display HMD is improved.

Second Embodiment

Next, a second embodiment of the present invention will be described with reference to FIGS. 7 and 8. In the second embodiment, a configuration of an optical sheet side light collecting portion 119 is altered. Similar configurations, operations, and effects as those of the first embodiment will not be described.

Figure 7:
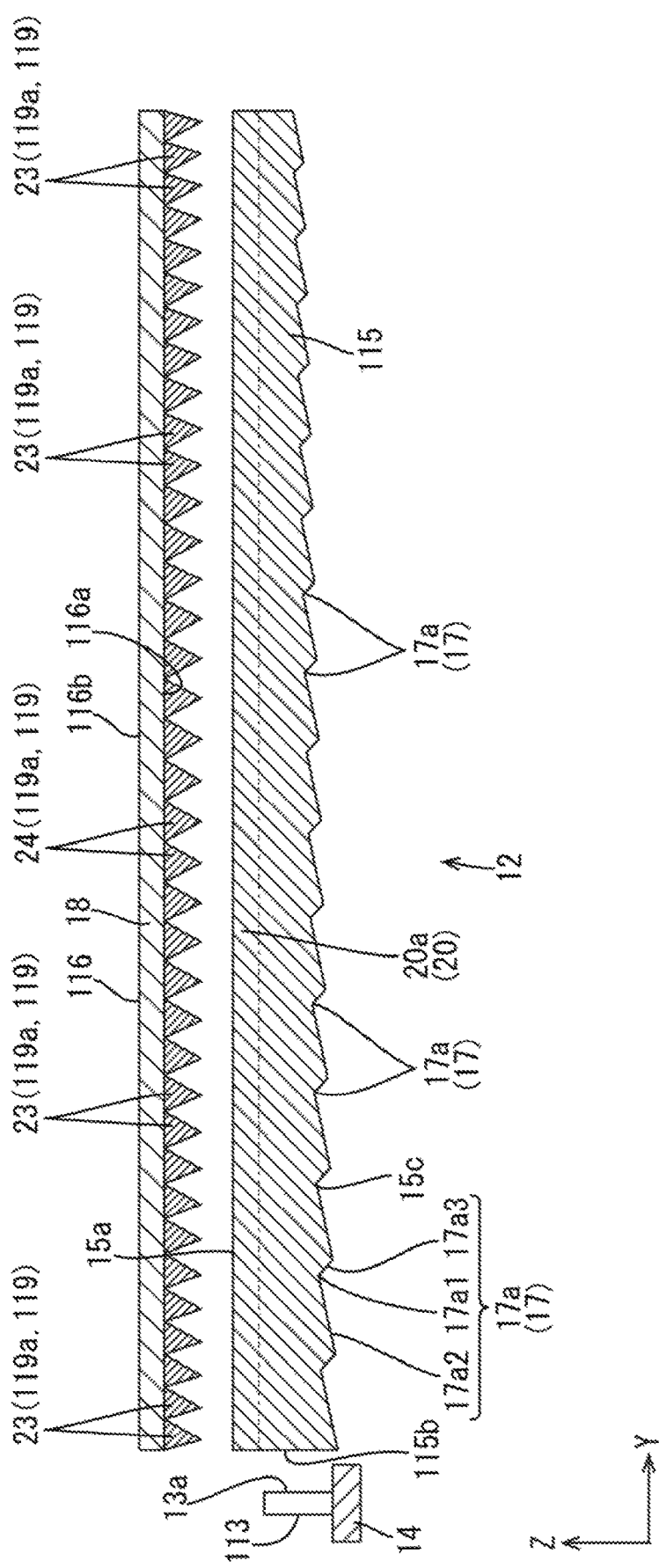
FIG. 7 is a cross-sectional view of a backlight device according to a second embodiment of the present invention taken along a long-side direction thereof.
Figure 8:
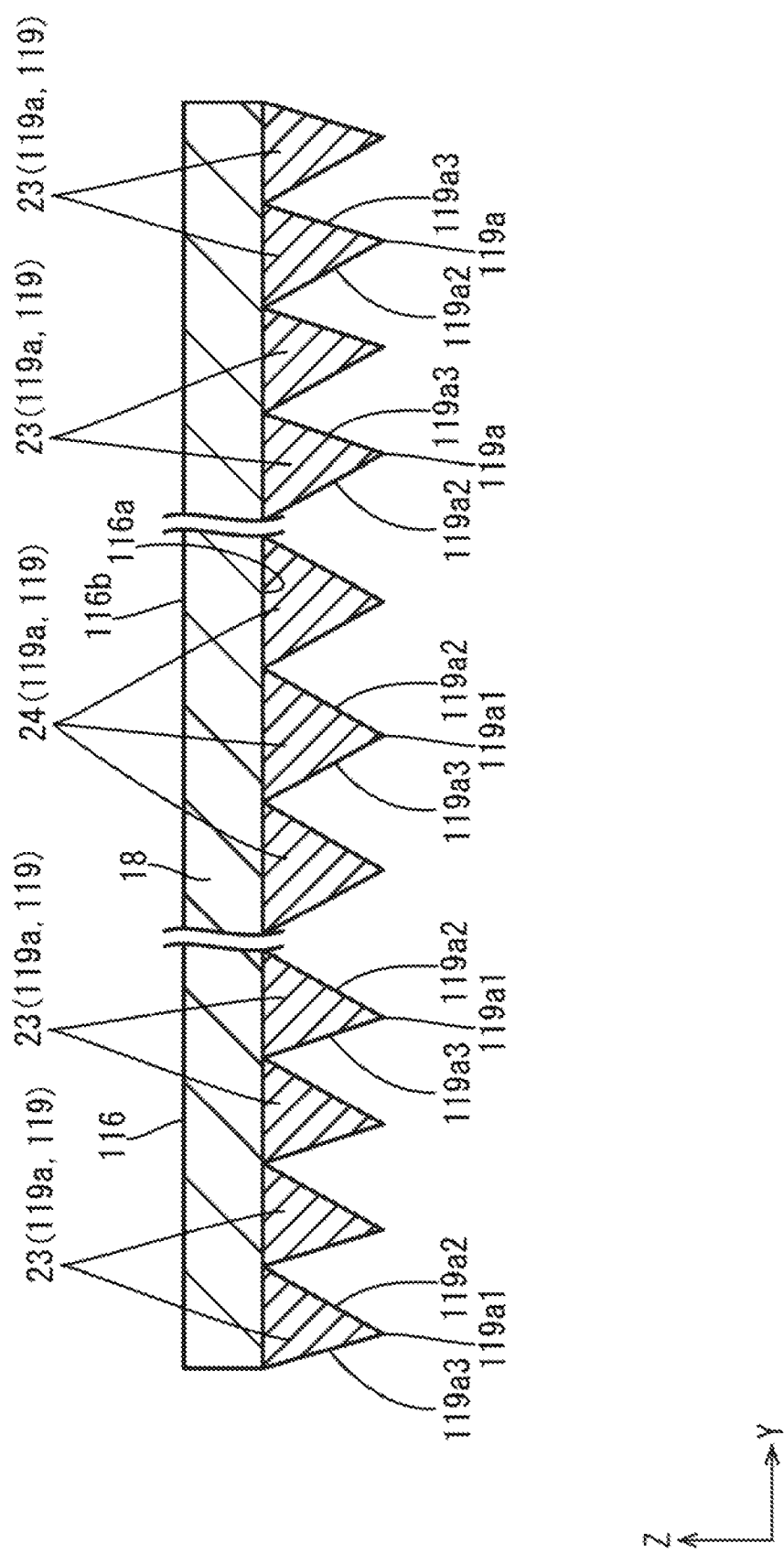
FIG. 8 is an enlarged cross-sectional view illustrating optical sheet prism portions of an optical sheet included in the backlight device.

As illustrated in FIG. 7, the optical sheet side light collecting portion (the light refracting portion) 119 according to this embodiment includes optical sheet prism portions 119a similar to the first embodiment. The optical sheet prism portions 119a extend in the X-axis direction (the perpendicular direction) perpendicular to the Y-axis direction (a normal direction of a light guide plate light entering surface 115b) on an optical sheet light entering surface 116a of an optical sheet 116 and are arranged in the Y-axis direction. Each of the optical sheet prism portion 119a includes a top portion 119a1 and a pair of sloped surfaces 119a2, 119a3 having the top portion 119a1 therebetween. As illustrated in FIG. 8, the optical sheet prism portions 119a include a top portion off-centered optical sheet prism portion (a top portion off-centered prism portion) 23 and a top portion non-off-centered optical prism portion (a top portion non-off-centered prism portion) 24. The top portion off-centered optical sheet prism portion 23 includes the top portion 119a1 that is off-centered with respect to the Y-axis direction, and the top portion non-off-centered optical sheet prism portion 24 includes the top portion 119a1 that is not off-centered with respect to the Y-axis direction. The top portion non-off-centered optical sheet prism portion 24 is included in a middle section of the optical sheet light entering surface 116a with respect to the Y-axis direction. The top portion non-off-centered optical sheet prism portion 24 has substantially an isosceles triangular cross-sectional shape and includes the top portion 119a1 that is not off-centered with respect to the X-axis direction and the sloped surfaces 119a2, 119a3 have a same inclination angle with respect to the Y-axis direction. The pair of sloped surfaces 119a2, 119a3 of the top portion non-off-centered optical sheet prism portion 24 has a same area. The liquid crystal panel is not illustrated in FIG. 7.

The top portion off-centered optical sheet prism portions 23 are included closer to edges of the optical sheet light entering surface 116a with respect to the Y-axis direction than the top portion non-off-centered optical sheet prism portion 24 is. Each of the top portion off-centered optical sheet prism portions 23 includes the top portion 119a1 closer to the edge of the optical sheet light entering surface 116a with respect to the Y-axis direction. According to such a configuration, among the pair of sloped surfaces 119a2, 119a3 of the top portion off-centered optical sheet prism portion 23, the second sloped surface 119a3 that is on the edge side (on an opposite side from the top portion non-off-centered optical sheet prism portion 24 side) with respect to the Y-axis direction has an inclination angle with respect to the Y-axis direction greater than the inclination angle of the first sloped surface 119a2 that is on the middle section side (on the top portion non-off-centered optical sheet prism portion 24 side) with respect to the Y-axis direction. Difference between the inclination angles of the first sloped surface 119a2 and the second sloped surface 119a3 of the top portion off-centered optical sheet prism portion 23 with respect to the Y-axis direction is varied according to the position of the top portion off-centered optical sheet prism portion 23 on the optical sheet light entering surface 116a with respect to the Y-axis direction and is continuously and gradually increased as the position of the top portion off-centered optical sheet prism portion 23 is closer to the edge from the middle section with respect to the Y-axis direction. The second sloped surface 119a3 of the top portion off-centered optical sheet prism portion 23 has an area smaller than that of the first sloped surface 119a2. Difference between the areas of the first sloped surface 119a2 and the second sloped surface 119a3 of the top portion off-centered optical sheet prism portion 23 is continuously and gradually increased as the position of the top portion off-centered optical sheet prism portion 23 on the optical sheet light entering surface 116a with respect to the X-axis direction is closer to the edge from the middle section. The top portion off-centered optical sheet prism portions 23 that are disposed on the LED 113 side (on the left side in FIGS. 7 and 8) with respect to the top portion non-off-centered optical sheet prism portion 24 in the Y-axis direction include the first sloped surfaces 119a2 on an opposite side from the LED 113 side in the Y-axis direction and the second sloped surfaces 119a3 on the LED 113 side in the Y-axis direction. The top portion off-centered optical sheet prism portions 23 that are disposed on an opposite side from the LED 113 side (on the right side in FIGS. 7 and 8) with respect to the top portion non-off-centered optical sheet prism portion 24 in the Y-axis direction include the first sloped surfaces 119a2 on the LED 113 side in the Y-axis direction and the second sloped surfaces 119a3 on the opposite side from the LED 113 side in the Y-axis direction.

The top portion off-centered optical sheet prism portions 23 apply the refracting action to the light at the sloped surfaces 119a2, 119a3 on the opposite side from the LED 113 side, which is not illustrated. Specifically, the refracting action is applied to the light at the first sloped surfaces 119a2 on the opposite side from the LED 113 side with respect to the respective top portions 119a in the Y-axis direction by the top portion off-centered optical sheet prism portions 23 that are on the LED 113 side with respect to the top portion non-off-centered optical sheet prism portion 24 in the Y-axis direction. The inclination angle of the first sloped surfaces 119a2 with respect to the Y-axis direction is smaller than that of the second sloped surfaces 119a3 and therefore, the light rays are refracted to be directed to the middle section with respect to the Y-axis direction by the first sloped surfaces 119a2. The refracting action is applied to the light at the second sloped surfaces 119a3 on the opposite side from the LED 113 side with respect to the respective top portions 119a in the Y-axis direction by the top portion off-centered optical sheet prism portions 23 that are on an opposite side from the LED 113 side with respect to the top portion non-off-centered optical sheet prism portion 24 in the Y-axis direction. The inclination angle of the second sloped surfaces 119a3 with respect to the Y-axis direction is greater than that of the first sloped surfaces 119a2 and therefore, the light rays are refracted to be directed to the middle section with respect to the Y-axis direction by the second sloped surfaces 119a3. As described before, the top portion 119a of the top portion off-centered optical sheet prism portion 23 is off-centered toward the edge of the optical sheet light entering surface 116a in the Y-axis direction and therefore, an anisotropic refracting action is applied to the light such that the exiting light rays are directed to the middle section of the liquid crystal panel, which is not illustrated, with respect to the Y-axis direction.

As described before, according to tis embodiment, the optical member at least includes a light guide plate 115, and the optical sheet 116 disposed on the light guide plate 115 on a liquid crystal panel side and having the optical sheet light exit surface 116b on a plate surface opposite the liquid crystal panel. The optical sheet 116 at least includes the optical sheet light collecting portion 119, which is the light refracting portion. According to such a configuration, the light rays emitted by the LEDs 113 and entering the light guide plate 115 travel within the light guide plate 115 and exit the light guide plate 115 and enter the optical sheet 116. The light rays to which the optical action is applied by the optical sheet 116 exit the optical sheet 116 through the optical sheet light exit surface 116b toward the liquid crystal panel. The anisotropic refracting action is applied to the light rays exiting through the edge portion of the optical sheet light exit surface 116b of the optical sheet 116 such that the light rays are directed toward the middle section of the liquid crystal panel by the optical sheet light collecting portion 119. Thus, the light use efficiency is improved.

The light guide plate 115 has the light guide plate light entering surface 115b at an edge surface thereof and the light emitted by the LEDs 113 enter through the light guide plate light entering surface 115b. The optical sheet 116 has a plate surface opposite the light guide plate 115 as the optical sheet light entering surface (the light entering surface) 116a. The optical sheet light collecting portion 119, which is the light refracting portion, includes the optical sheet prism portions (prisms) 119a. The optical sheet prism portions 119a extend in the perpendicular direction perpendicular to the normal direction of the light guide plate light entering surface 115b on the optical sheet light entering surface 116a of the optical sheet 116 and are arranged in the normal direction. Each of the optical sheet prism portions 119a includes a top portion 119a1 and a pair of sloped surfaces 119a2, 119a3 having the top portion 119a1 therebetween. The optical sheet prism portions 119a at least include the top portion off-centered optical sheet prism portions (the top portion off-centered prism portions) 23. The top portion off-centered optical sheet prism portions 23 are included at the edge portion of the optical sheet light entering surface 116a with respect to the normal direction and includes the top portion 119a1 off-centered with respect to the normal direction and closer to the edge portion of the optical sheet light entering surface 116a. According to such a configuration, the optical sheet prism portions 119a extending in the perpendicular direction perpendicular to the normal direction of the light guide plate light entering surface 115b on the optical sheet light entering surface 116a of the optical sheet 16 and arranged in the normal direction apply the refracting actions to the light rays at the sloped surfaces 119a2, 119a3 that are on the opposite side from the LED 113 side with respect to the respective top portions 113a1 in the normal direction. The top portion off-centered optical sheet prism portions 23 of the optical sheet prism portions 119a are included in the edge portion of the optical sheet light entering surface 116a of the optical sheet 116 with respect to the normal direction. Thus, the top portion off-centered optical sheet prism portions 23 include the respective top portions 119a1 off-centered toward the edge of the optical sheet light entering surface 116a with respect to the normal direction. According to such a configuration, the top portion off-centered optical sheet prism portions 23 apply the anisotropic refracting action to the light such that the exiting light rays are directed toward the middle section of the liquid crystal panel.

Third Embodiment

Next, a third embodiment of the present invention will be described with reference to FIGS. 9 and 10. In the third embodiment, a configuration of an exit light reflection portion 217 is altered from that of the first embodiment. Similar configurations, operations, and effects as those of the first embodiment will not be described.

Figure 9:
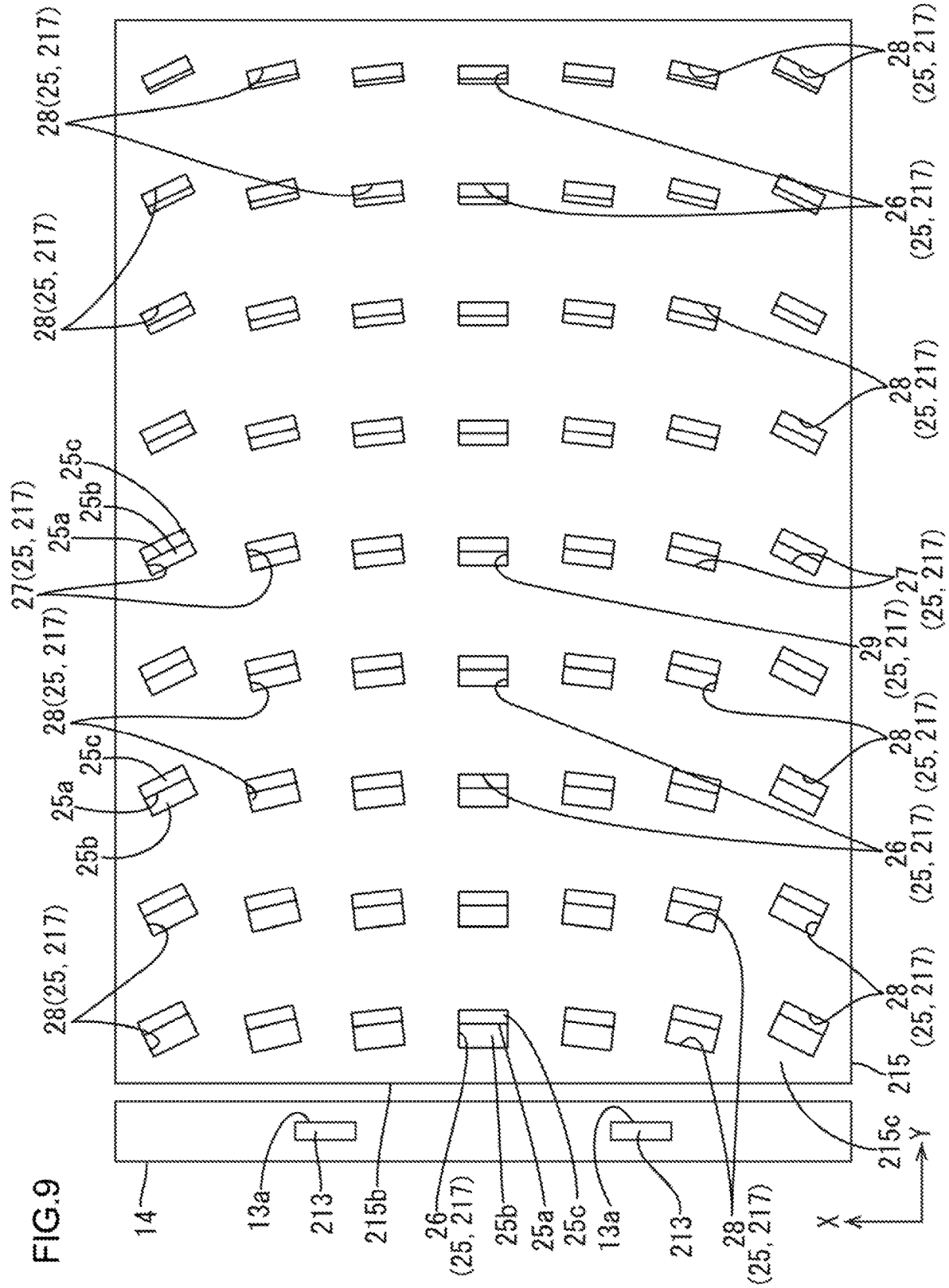
FIG. 9 is a bottom view of LEDs and a light guide plate included in a backlight device according to a third embodiment of the present invention.
Figure 10:
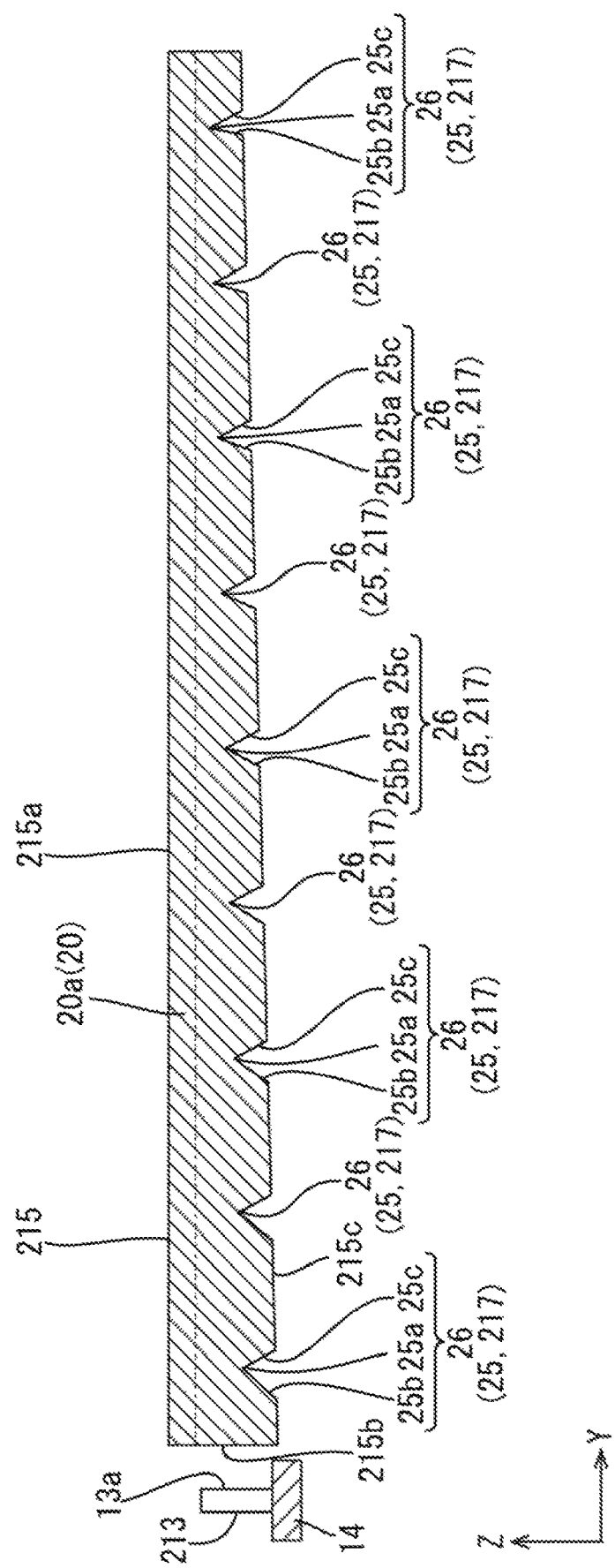
FIG. 10 is a cross-sectional view of the backlight device taken along a long-side direction thereof.

As illustrated in FIGS. 9 and 10, the exit light reflection portion (the light refracting portion) 217 according to this embodiment includes microprism portions 25 that are arranged in the X-axis direction and the Y-axis direction on an opposite surface 215c of a light guide plate 215. Each of the microprism portions 25 includes a top portion 25a and a pair of sloped surfaces 25b, 25c having the top portion 25a therebetween. The sloped surface 25b is arranged on an LED 213 side and the sloped surface 25c is arranged on an opposite side from the LED 213 side in the Y-axis direction. The microprism portions 25 are two-dimensionally arranged dispersedly within a plane surface of the opposite surface 215c. Other than this, the microprism portions 25 are formed in a recessed shape and reflect light travelling within the light guide plate 215 to accelerate the light to exit the light guide plate 215 similar to the unit reflection portions 17a of the first embodiment. Among the pair of sloped surfaces 25b, 25c of the microprism portion 25, the first sloped surface 25b on the LED 213 side with respect to the Y-axis direction mainly exerts a function of applying the refracting action to the light to exit through the light guide plate light exit surface 215a. The optical sheet and the liquid crystal panel are not illustrated in FIG. 9.

As illustrated in FIGS. 9 and 10, the microprism portions 25 at least include top portion off-centered microprism portions 26 and inclined microprism portions 27. The top portion off-centered microprism portions 26 are included in a middle section with respect to the X-axis direction and in an edge portion with respect to the Y-axis direction on the opposite surface 215c. Each of the top portion off-centered microprism portions 26 has a top portion 25a off-centered toward the middle section of the opposite surface 215c with respect to the Y-axis direction. The inclined microprism portions 27 are included in a middle section with respect to the Y-axis direction and in an edge portion with respect to the X-axis direction on the opposite surface 215c. Each of the inclined microprism portions 27 has a first sloped surface (a light source side sloped surface) 25b on the LED 213 side with respect to the top portion 25a. The first sloped surface 25b is inclined with respect to a light guide plate light entering surface 215b so as to face the middle section of the opposite surface 215c with respect to the X-axis direction. The microprism portions 25 further include top portion off-centered inclined microprism portions 28 and a top portion non-off-centered non-inclined microprism portion 29. The top portion off-centered inclined microprism portions 28 are included in the edge portions of the opposite surface 215c with respect to the X-axis direction and the Y-axis direction and have the respective top portions 25a off-centered like the top portion off-centered microprism portions 26 and have the first sloped surface 25b inclined similarly to the Inclined microprism portions 27. The top portion non-off-centered non-inclined microprism portion 29 is included in the middle section (a center) of the opposite surface 215c with respect to the X-axis direction and the Y-axis direction and has the top portion 25a that is not off-centered with respect to the Y-axis direction and the first sloped surface 25b that is not inclined.

As illustrated in FIG. 10, the top portion off-centered microprism portions 26 are included in the middle section of the opposite surface 215c with respect to the X-axis direction and closer to the edge with respect to the Y-axis direction than the top portion non-off-centered non-inclined microprism portion 29 is. Each of the top portion off-centered microprism portions 26 includes the top portion 25a off-centered to the middle section of the opposite surface 215c with respect to the Y-axis direction. According to the configuration that the top portion 25a is off-centered, the inclination angle of the first sloped surface 25b on the LED 213 side of the top portion off-centered microprism portion 26 with respect to the Y-axis direction is varied according to the position of the top portion off-centered microprism portion 26 on the opposite surface 215c with respect to the Y-axis direction. Specifically, the inclination angle of the first sloped surface 25b is continuously and gradually decreased as the position of the top portion off-centered microprism portion 26 is closer to the LED 213 in the Y-axis direction and the inclination angle of the first sloped surface 25b is continuously and gradually increased as the position thereof is farther away from the LED 213 in the Y-axis direction. According to the top portion off-centered microprism portions 26 having such a configuration, if the light is refracted by the first sloped surfaces 25b on the LED 213 side with respect to the respective top portions 25a, the exiting light is directed toward the middle section of the liquid crystal panel, which is not illustrated, with respect to the Y-axis direction.

As illustrated in FIG. 9, the inclined microprism portions 27 are included in the middle section of the opposite surface 215c with respect to the Y-axis direction and closer to the edge with respect to the X-axis direction than the top portion non-off-centered non-inclined microprism portion 29 is. The first sloped surface 25b on the LED 213 side with respect to the top portion 25a is inclined with respect to the light guide plate light entering surface 215b to face the middle section of the opposite surface 215c with respect to the X-axis direction. Specifically, the inclination angle of the first sloped surface 25b of the inclined microprism portion 27 with respect to the light guide plate light entering surface 215b is varied according to the position of the inclined microprism portion 27 on the opposite surface 215c with respect to the X-axis direction. Specifically, the inclination angle of the first sloped surface 25b is continuously and gradually decreased as the position of the inclined microprism portion 27 is closer to the middle section of the opposite surface 215c in the X-axis direction and the inclination angle of the first sloped surface 25b is continuously and gradually increased as the position thereof is farther away from the middle section of the opposite surface 215c in the X-axis direction. In the inclined microprism portion 27 having such a configuration, if the light is refracted by the first sloped surface 25b, the exiting light rays are directed toward the middle section of the liquid crystal panel, which is not illustrated, with respect to the X-axis direction. The top portion off-centered inclined microprism portions 28 have the configuration and the optical function of the top portion off-centered microprism portion 26 and the inclined microprism portion 27, which will not be described. According to such a configuration, the light rays refracted by the top portion off-centered microprism portions 26, the inclined microprism portions 27, and the top portion off-centered inclined microprism portions 28 include a great amount of light rays directed toward the middle section of the liquid crystal panel. Therefore, light use efficiency is improved.

As described before, according to this embodiment, the light guide plate 215 has a plate surface opposite from the light guide plate light exit surface 215a as the opposite surface 215c. The exit light reflection portion 217, which is the light refracting portion, includes microprism portions 25 that are arranged in the normal direction of the light guide plate light entering surface 215b and the perpendicular direction perpendicular to the normal direction on the opposite surface 215c. Each of the microprism portions 25 includes the top portion 25a and a pair of sloped surfaces 25b, 25c having the top portion 25a therebetween. The sloped surface 25b is arranged on the LED 213 side and the sloped surface 25c is arranged on the opposite side from the LED 213 side in the normal direction. The microprism portions 25 at least include the top portion off-centered microprism portions 26 and the inclined microprism portions 27. The top portion off-centered microprism portions 26 are included in the edge portion with respect to the normal direction on the opposite surface 215c and the top portion 25a of each top portion off-centered microprism portion 26 is off-centered toward the middle section of the opposite surface 215c with respect to the normal direction. The inclined microprism portions 27 are included in the edge portion with respect to the perpendicular direction on the opposite surface 215c. Each of the inclined microprism portions 27 has the first sloped surface 25b on the LED 213 side with respect to the top portion 25a and the first sloped surface 25b is inclined with respect to the light guide plate light entering surface 215b so as to face the middle section of the opposite surface 215c with respect to the perpendicular direction. According to such a configuration, the microprism portions 25 that are arranged in the normal direction of the light guide plate light entering surface 215b and the perpendicular direction perpendicular to the normal direction on the opposite surface 215c of the light guide plate 215 apply the refracting action to light mainly with the first sloped surfaces 25b on the LED 213 side with respect to the top portion 25a. Among the microprism portions 25, the top portion off-centered microprism portions 26 on the edge side of the opposite surface 215c of the light guide plate 215 with respect to the normal direction have the top portions 25a that are off-centered toward the middle section of the opposite surface 215c in the normal direction. According to such a configuration, if the light is refracted by the first sloped surfaces 25b on the LED 213 side with respect to the respective top portions 25a, the exiting light is directed toward the middle section of the liquid crystal panel with respect to the normal direction. Among the microprism portions 25, the inclined microprism portions 27 that are included in the edge portion with respect to the perpendicular direction on the opposite surface 215c of the light guide plate 215 have the first sloped surfaces 25b on the LED 213 side with respect to the top portions 25a and the first sloped surfaces 25b are inclined with respect to the light guide plate light entering surface 215b so as to face the middle section of the opposite surface 215c with respect to the perpendicular direction. According to such a configuration, if the light is refracted by the first sloped surfaces 25b on the LED 213 side with respect to the respective top portions 25a, the exiting light is directed toward the middle section of the liquid crystal panel with respect to the perpendicular direction. The light rays refracted by the top portion off-centered microprism portions 26 and the inclined microprism portions 27 include a great amount of light rays directed toward the middle section of the liquid crystal panel. Therefore, light use efficiency is improved.

Fourth Embodiment

Next, a fourth embodiment of the present invention will be described with reference to FIGS. 11 and 12. In the fourth embodiment, a configuration of an optical sheet 316 is altered from that of the first embodiment. Similar configurations, operations, and effects as those of the first embodiment will not be described.

Figure 11:
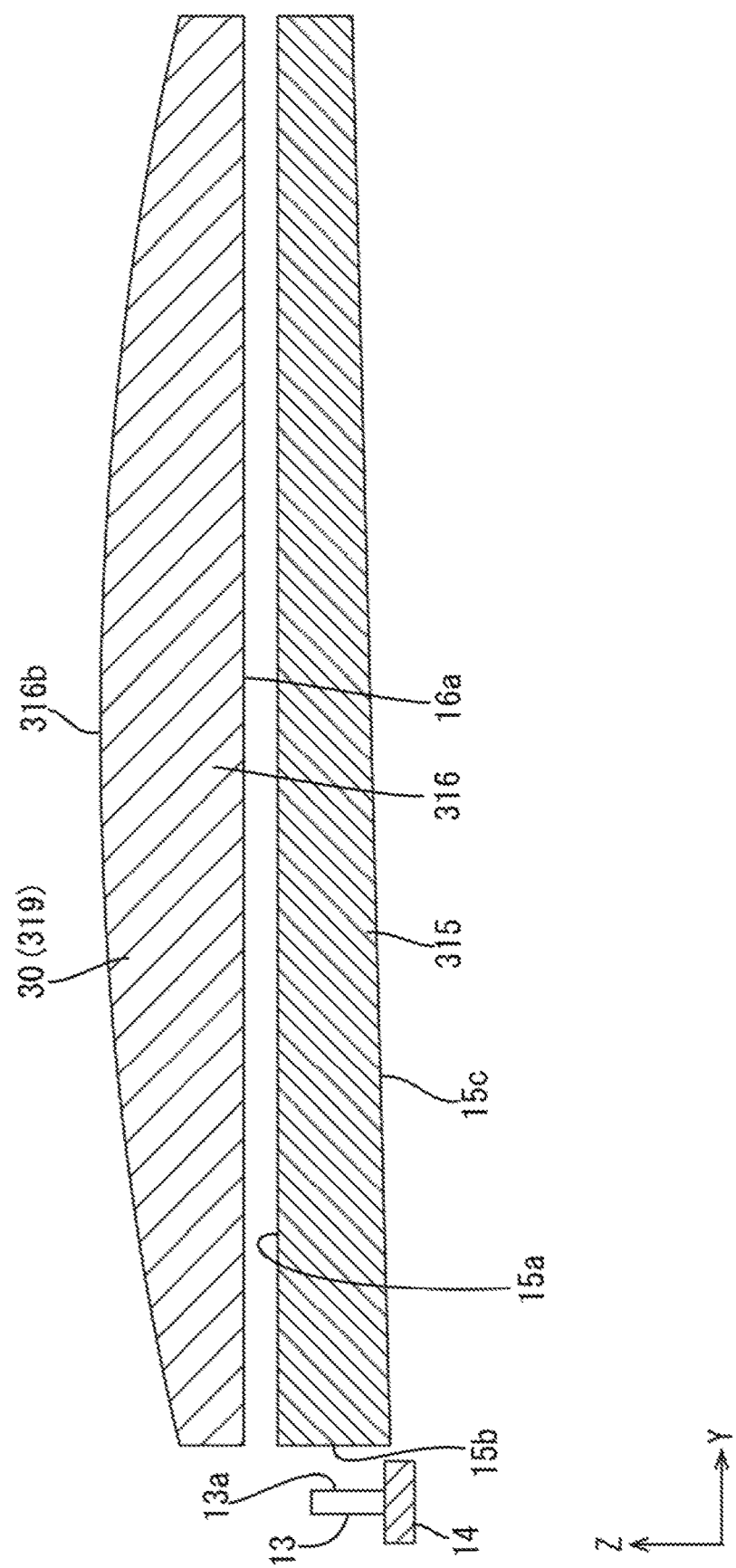
FIG. 11 is a cross-sectional view of a backlight device according to a fourth embodiment of the present invention taken along a long-side direction thereof.
Figure 12:
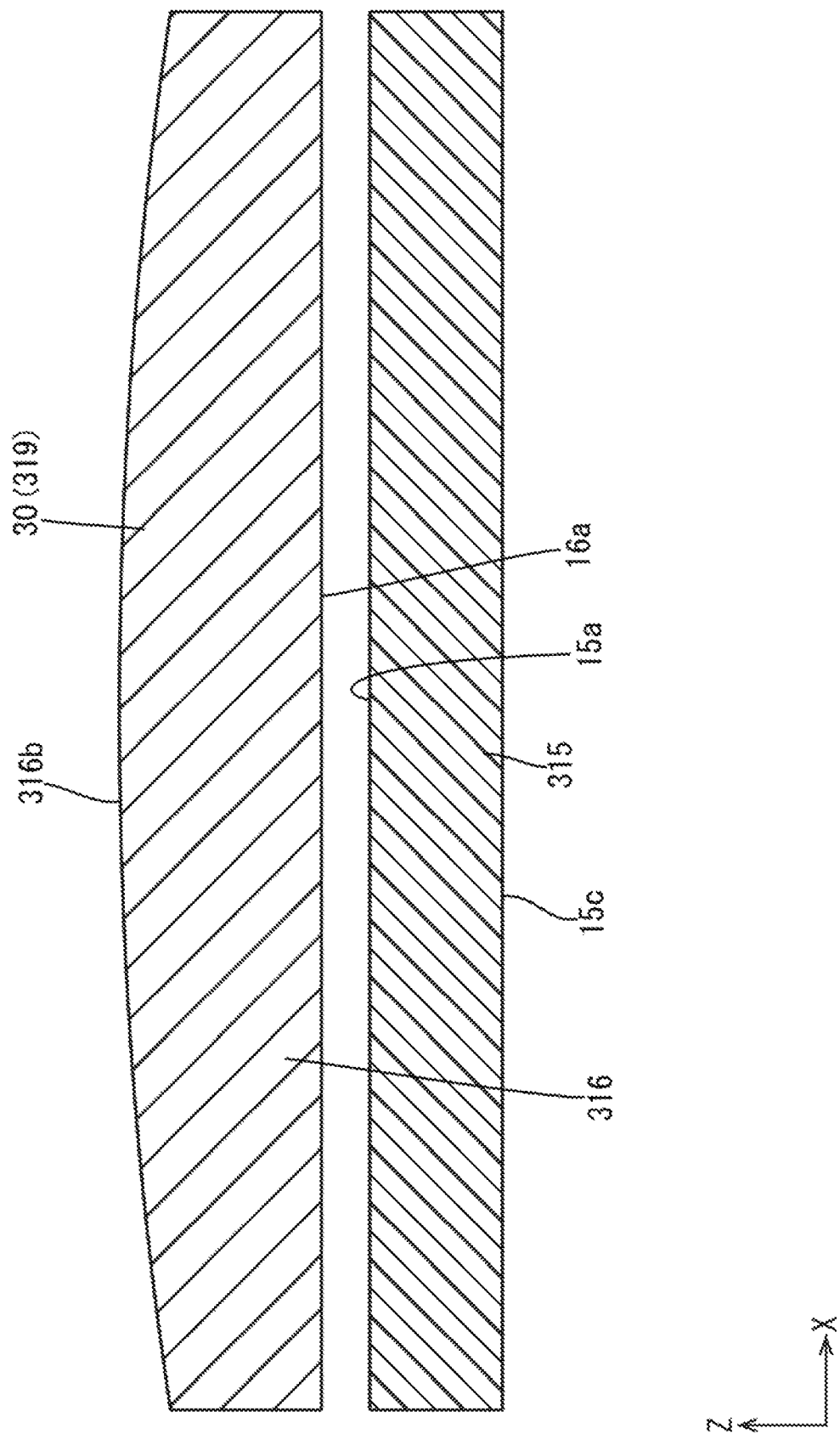
FIG. 12 is a cross-sectional view of the backlight device taken along a short-side direction thereof.

As illustrated in FIGS. 11 and 12, the optical sheet 316 of this embodiment is a spherical lens sheet including a spherical lens (the light refracting portion) 30. The optical sheet 316 has the spherical lens 30 on an optical sheet light exit surface 316b and the spherical lens 30 has a spherical surface. The spherical lens 30 has a curvature on a surface thereof relatively smaller at a peripheral edge portion than a center portion of the optical sheet light exit surface 316b. With the spherical lens 30 having such a configuration, components of astigmatism can be removed. Accordingly, the light use efficiency is further improved and a cost for producing the optical sheet 316 is reduced compared to a configuration including a lens having other complicated structure. The light guide plate 315 is illustrated simply in the embodiments from this embodiment to a seventh embodiment.

As described before, according to this embodiment, an optical sheet light collecting portion 319, which is the light refracting portion, includes the spherical lens 30 included on the optical sheet light exit surface 316b of the optical sheet 316 and having a curvature relatively smaller at the peripheral edge portion than a center portion of the optical sheet light exit surface 316b. The spherical lens 30 included on the optical sheet light exit surface 316b of the optical sheet 316 has a curvature relatively smaller at the peripheral edge portion than the center portion of the optical sheet light exit surface 316b. With the spherical lens 30 having such a configuration, components of astigmatism can be removed. Accordingly, the light use efficiency is further improved and a cost for producing the optical sheet 316 is reduced compared to a configuration including a lens having other complicated structure.

Fifth Embodiment

Next, a fifth embodiment of the present invention will be described with reference to FIGS. 13 and 14. In the fifth embodiment, a configuration of an optical sheet 416 is altered from that of the first embodiment. Similar configurations, operations, and effects as those of the first embodiment will not be described.

Figure 13:
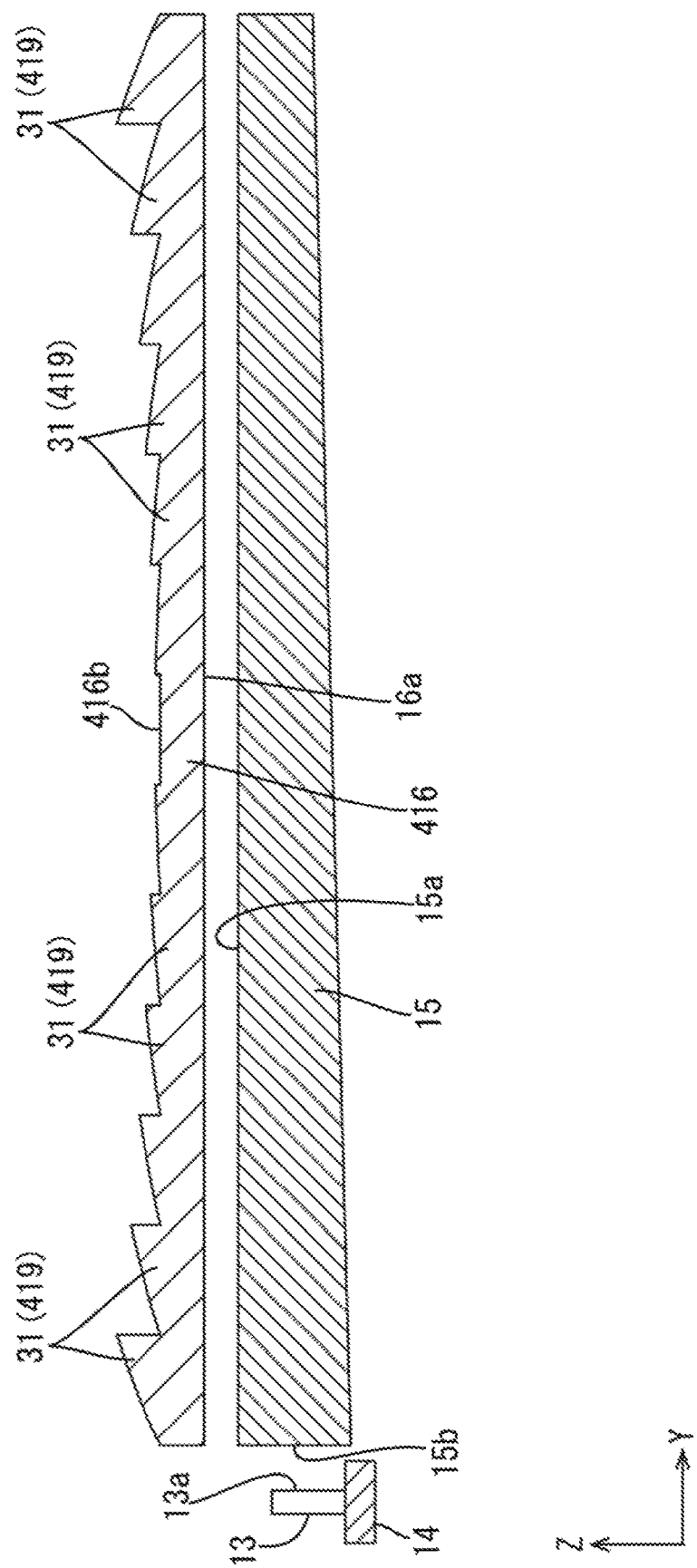
FIG. 13 is a cross-sectional view of a backlight; device according to a fifth embodiment of the present invention taken along a long-side direction thereof.
Figure 14:
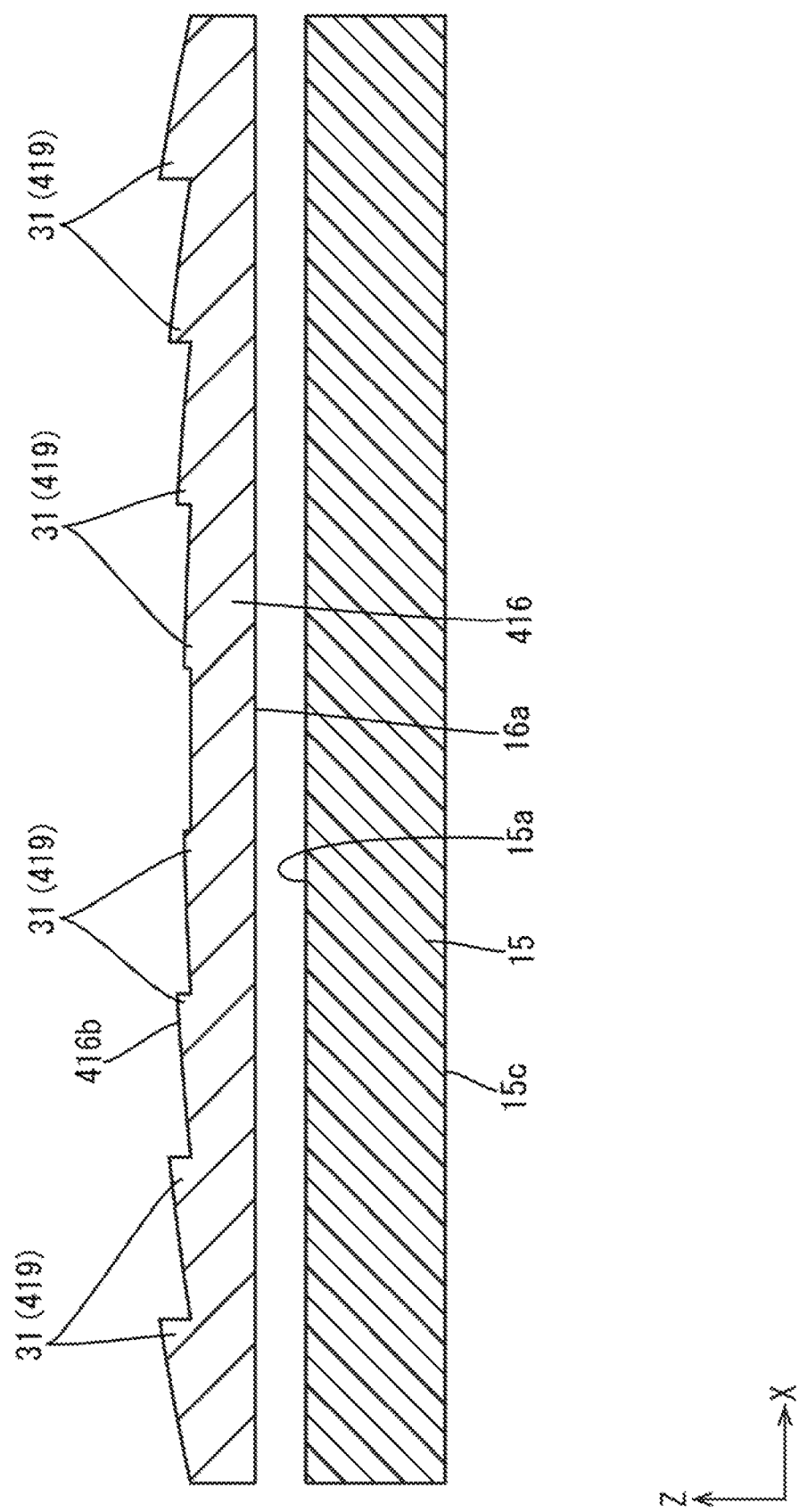
FIG. 14 is a cross-sectional view of the backlight device taken along a short-side direction thereof.

As illustrated in FIGS. 13 and 14, the optical sheet 416 of this embodiment is a Fresnel lens sheet including a Fresnel lens (the light refracting portion) 31. The optical sheet 416 has the Fresnel lens 31 on an optical sheet light exit surface 416b and the Fresnel lens 31 has spherical surfaces in different levels. The Fresnel lens 31 has a curvature on a surface thereof relatively smaller at a peripheral edge portion than a center portion of the optical sheet light exit surface 416b. With the Fresnel lens 31 having such a configuration, components of astigmatism can be removed. Accordingly, the light use efficiency is further improved and the optical sheet can be thinner.

As described before, according to this embodiment, an optical sheet light collecting portion 419, which is the light refracting portion, includes the Fresnel lens 31 included on the optical sheet light exit surface 416b of the optical sheet 416 and having a curvature relatively smaller at the peripheral edge portion than the center portion of the optical sheet light exit surface 416b. The Fresnel lens 31 included on the optical sheet light exit surface 416b of the optical sheet 416 has a curvature relatively smaller at the peripheral edge portion than the center portion of the optical sheet light exit surface 416b. With the Fresnel lens 31 having such a configuration, components of astigmatism can be removed. Accordingly, the light use efficiency is further improved and the optical sheet can be thinner.

Sixth Embodiment

Next, a sixth embodiment of the present invention will be described with reference to FIGS. 15 and 16. In the sixth embodiment, a configuration of an optical sheet 516 is altered from that of the first embodiment. Similar configurations, operations, and effects as those of the first embodiment will not be described.

Figure 15:
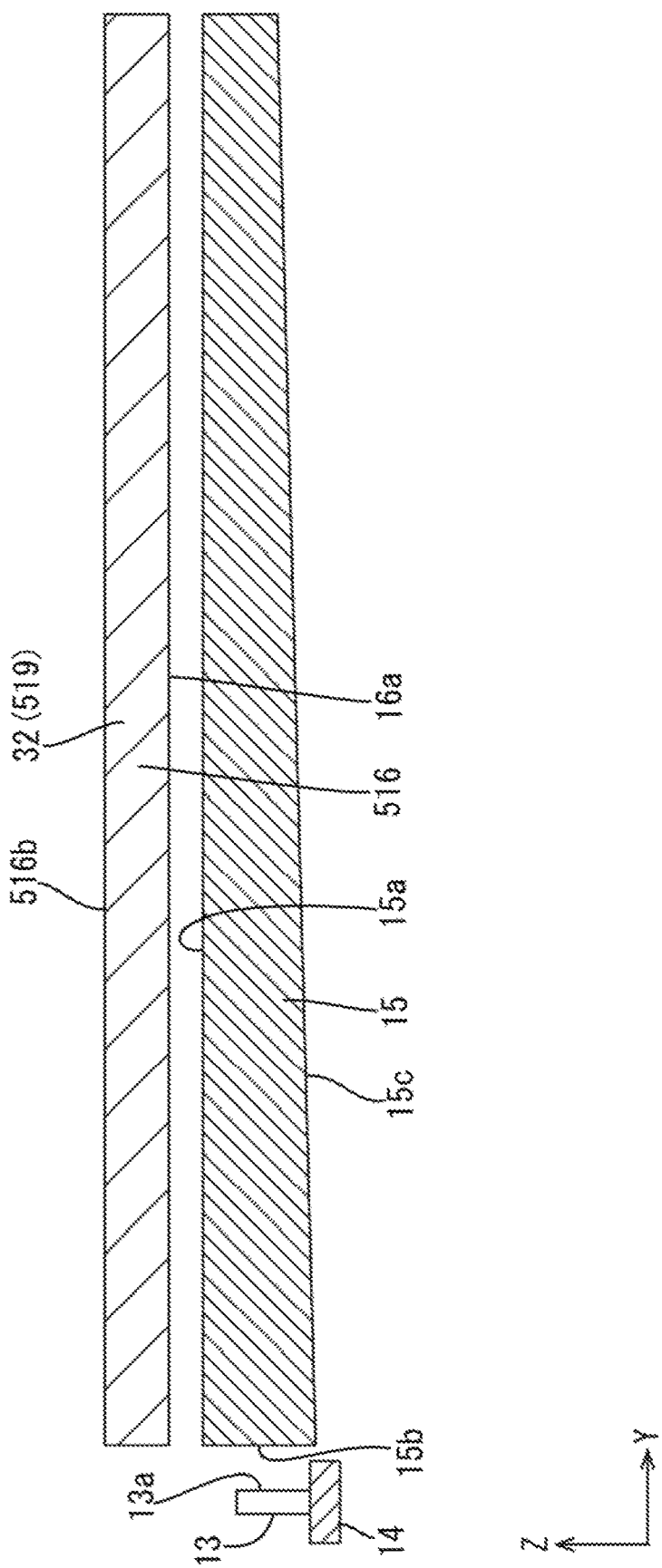
FIG. 15 is a cross-sectional view of a backlight device according to a sixth embodiment of the present invention taken along a long-side direction thereof.
Figure 16:
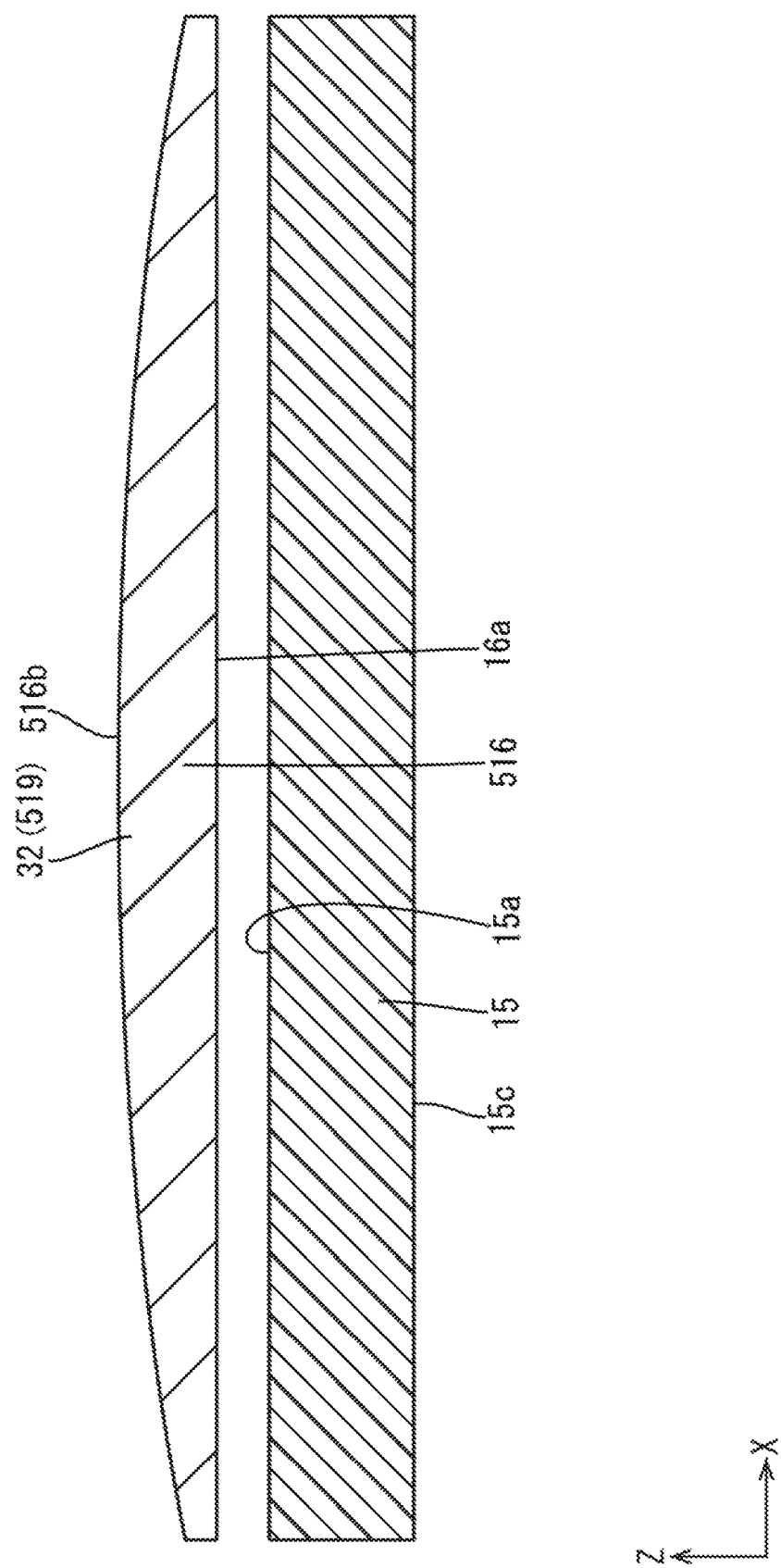
FIG. 16 is a cross-sectional view of the backlight device taken along a short-side direction thereof.

As illustrated in FIGS. 15 and 16, the optical sheet 516 of this embodiment is a cylindrical lens sheet including a cylindrical lens (the light refracting portion) 32. The optical sheet 516 has the cylindrical lens 32 on an optical sheet light exit surface 516b and an axial direction of the cylindrical lens 32 matches the Y-axis direction. Therefore, the cylindrical lens 32 has no curvature on a surface thereof with respect to the Y-axis direction and has a curvature on a surface thereof with respect to the X-axis direction. Accordingly, in the cylindrical lens 32, a cross-sectional shape of the optical sheet light exit surface 516b cut along the Y-axis direction is flat and a cross-sectional shape of the optical sheet light exit surface 516b cut along the X-axis direction is an arched shape. The cylindrical lens 32 has a curvature on a surface thereof relatively smaller at a peripheral edge portion than a center portion of the optical sheet light exit surface 516b with respect to the X-axis direction. With the cylindrical lens 32 having such a configuration, components of astigmatism can be removed. Accordingly, the light use efficiency is further improved and a cost for producing the optical sheet 516 is reduced compared to a configuration including a lens having other complicated structure.

As described before, according to this embodiment, an optical sheet light collecting portion 519, which is the light refracting portion, includes the cylindrical lens 32 included on the optical sheet light exit surface 516*b* of the optical sheet 516 and having a curvature relatively smaller at the peripheral edge portion than the center portion of the optical sheet light exit surface 516*b*. The Fresnel lens 32 included on the optical sheet light exit surface 516*b* of the optical sheet 516 has a curvature relatively smaller at the peripheral edge portion than the center portion of the optical sheet light exit surface 516*b*. With the cylindrical lens 32 having such a configuration, components of astigmatism can be removed. Accordingly, the light use efficiency is further improved and a cost for producing the optical sheet 516 is reduced compared to a configuration including a lens having other complicated structure.

Seventh Embodiment

Next, a seventh embodiment of the present invention will be described with reference to FIGS. 17 and 18. In the seventh embodiment, a configuration of an optical sheet 616 is altered from that of the first embodiment. Similar configurations, operations, and effects as those of the first embodiment will not be described.

Figure 17:
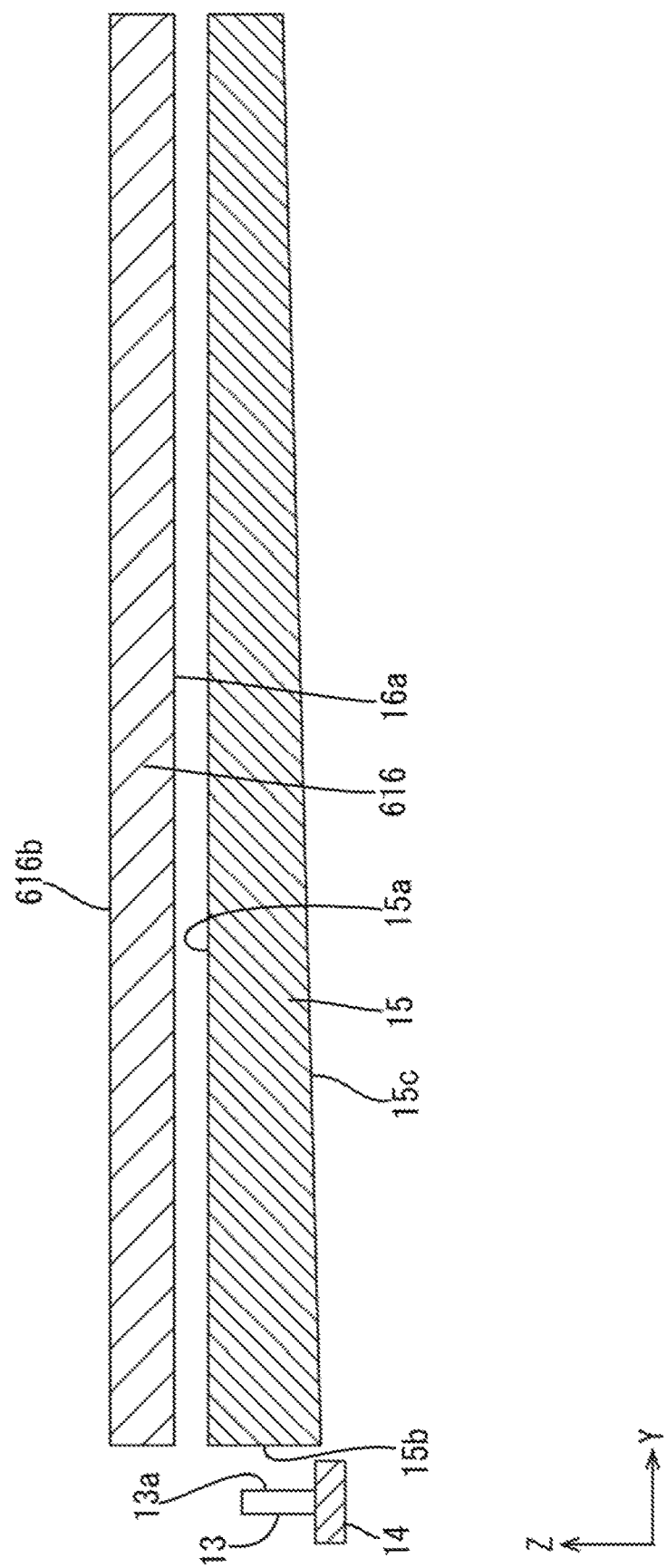
FIG. 17 is a cross-sectional view of a backlight device according to a seventh embodiment of the present invention taken along a long-side direction thereof.

As illustrated in FIGS. 17 and 18, the optical sheet 616 of this embodiment is a linear Fresnel lens sheet including a linear Fresnel lens (the light refracting portion) 33. The optical sheet 616 has the linear Fresnel lens 33 on an optical sheet light exit surface 616*b* and an axial direction of the linear Fresnel lens 33 matches the Y-axis direction and has no curvature on a surface thereof with respect to the Y-axis direction and has a curvature on a surface thereof with respect to the X-axis direction. Accordingly, in the cylindrical lens 32, a cross-sectional shape of the optical sheet light exit surface 616*b* cut along the Y-axis direction is flat and a cross-sectional shape of the optical sheet light exit surface 616*b* cut along the X-axis direction has arched spherical surfaces in different levels. The linear Fresnel lens 33 has a curvature on a surface thereof relatively smaller at a peripheral edge portion than a center portion of the optical sheet light exit surface 616*b*. With the linear Fresnel lens 33 having such a configuration, components of astigmatism can be removed. Accordingly, the light use efficiency is further improved and the optical sheet can be thinner.

As described before, according to this embodiment, an optical sheet light collecting portion 619, which is the light refracting portion, includes the linear Fresnel lens 33 included on the optical sheet light exit surface 616*b* of the optical sheet 616 and having a curvature relatively smaller at the peripheral edge portion than a center portion of the optical sheet light exit surface 616*b*. The linear Fresnel lens 33 included on the optical sheet light exit surface 616*b* of the optical sheet 616 has a curvature relatively smaller at the peripheral edge portion than the center portion of the optical sheet light exit surface 616*b*. With the linear Fresnel lens 33 having such a configuration, components of astigmatism can be removed. Accordingly, the light use efficiency is further improved and the optical sheet can be thinner.

Other Embodiments

The present invention is not limited to the embodiments, which have been described using the foregoing descriptions and the drawings. For example, embodiments described below are also included in the technical scope of the present invention.

(1) In the first to third embodiments, the difference between the areas or the inclination angles of the sloped surfaces varies continuously and gradually according to the position of the light guide plate prism portion, the optical sheet prism portion, and the microprism portion. However, the difference between the areas or the inclination angles of the sloped surfaces may vary in a stepwise and sequential manner according to the position of the light guide plate prism portion, the optical sheet prism portion, and the microprism portion. In such a configuration, the difference between the areas or the inclination angles of the sloped surfaces may be same in some of the light guide plate prism portions, the optical sheet prism portions, and the microprism portions.

(2) In a modification of each of the above embodiments, the extending direction of the light guide plate prism portions may match the perpendicular direction perpendicular to the normal direction of the light guide plate light entering surface, and the arrangement direction of the light guide plate prism portions may match the normal direction of the light guide plate light entering surface.

(3) In a modification of each of the above embodiments, the extending direction of the optical sheet prism portions may match the normal direction of the light guide plate light entering surface, and the arrangement direction of the optical sheet prism portions may match the perpendicular direction perpendicular to the normal direction of the light guide plate light entering surface.

(4) In a modification of the first embodiment, the light guide plate prism portions may not include the top portion non-off-centered light guide plate prism portion.

(5) In a modification of the second embodiment, the optical sheet prism portions may not include the top portion non-off-centered optical sheet prism portion.

(6) In a modification of the third embodiment, the microprism portions may not include the top portion off-centered inclined microprism portions and the top portion non-off-centered non-inclined microprism portion.

(7) In a modification of the sixth embodiment, the cylindrical lens may be configured such that the axial direction thereof matches the perpendicular direction perpendicular to the normal direction of the light guide plate light entering surface.

(8) In a modification of the seventh embodiment, the linear Fresnel lens may be configured such that the axial direction thereof matches the perpendicular direction perpendicular to the normal direction of the light guide plate light entering surface.

(9) The configuration of one of the first and second embodiments may be combined with the configuration of one of the third to seventh embodiments.

(10) In each of the above embodiments, the LEDs, which are point light sources, are used as the light source. However, other than the point light sources, a linear light source may be used as the light source.

(11) Each of the above embodiments includes the backlight device of an edge-light entering type in which light enters the light guide plate through one side surface thereof. However, a backlight device of a two-edge light entering type in which light enters the light guide plate through two side surfaces thereof may be used.

(12) Other than each of the above embodiments, the number of the LEDs mounted on the LED board may be altered as appropriate.

(13) In the drawings of each embodiment, a size and the number of the prism portions included in the light collecting portion are illustrated with deformation. The actual size and the actual number of the prism portions may differ from those illustrated in the drawings.

(14) In each of the above embodiments, the LEDs of a side surface light emitting type are used. However, LEDs of a top surface light emitting type may be used.

(15) In each of the above embodiments, the LEDs are used as the light source. However, other than the LEDs, laser diodes or organic ELs may be used as the light source.

(16) In the above embodiments, the liquid crystal display device including the liquid crystal panel is used. However, a display device including other type of display panels ((e.g., plasma display panels (PDPs), organic EL panels, electrophoretic display (EPD) panels, micro electro mechanical systems (MEMS) display panels) may be included in the scope of the present invention.

(17) In each of the above embodiments, the head-mounted display is used as an example. However, a head-up display or a projector may be used as a device for magnifying images displayed on the liquid crystal panel using a lens. The present invention may be applied to a liquid crystal display device without having a magnifying display function (such as television devices, tablet-type terminals, and smartphones).

(18) In modifications of the fourth to seventh embodiments, the optical sheet may be modified such that the spherical lens, the Fresnel lens, the cylindrical lens, and the linear Fresnel lens may have a curvature that is constant within a plane surface thereof. Furthermore, the curvature of the spherical lens, the Fresnel lens, the cylindrical lens, and the linear Fresnel lens may be relatively greater in the peripheral edge portion than the center portion of the light exit surface.

(19) In each of the above embodiments, the light guide plate includes the light guide plate side light collecting portion on the light guide plate light exit surface side and includes the exit light reflection portion on the opposite surface side. However, the arrangement thereof may be reversed and the light guide plate may include the exit light reflection portion on the light guide plate light exit surface side and include the light guide plate side light collecting portion on the opposite surface.

EXPLANATION OF SYMBOLS

10: liquid crystal display device (display device), 11: liquid crystal panel (display panel), 12: backlight device (lighting device), 13, 113, 213: LED (light source), 15, 115, 215, 315: light guide plate (optical member), 15a, 215a: light guide plate light exit surface (light exit surface), 14b, 115b, 215b: light guide plate light entering surface (light entering surface), 15c, 215c: opposite surface, 20: light guide plate side light collecting portion (light refracting portion), 20a: light guide plate prism portion (prism), 20a1: top portion, 20a2: first sloped surface (sloped surface), 20a3: second sloped surface (sloped surface), 21: top portion off-centered light guide plate prism portion (top portion off-centered prism portion), 23: top portion off-centered optical sheet prism portion (top portion off-centered prism portion), 25: microprism portion, 25a: top portion, 25b: first sloped surface (sloped surface), 25c: second sloped surface (sloped surface), 26: top portion off-centered microprism portions, 27: inclined microprism portions, 30: spherical lens, 31: Fresnel lens, 32: cylindrical lens, 33: linear Fresnel lens, 116, 316, 416, 516, 616: optical sheet (optical member), 116a: optical sheet light entering surface (light entering surface), 116b: optical sheet light exit surface (light exit surface), 119, 319, 419, 519, 619: optical sheet side light collecting portion (light refracting portion), 119a: optical sheet prism portion (prism), 119a1: top portion, 119a2: first sloped surface (sloped surface), 119a3: second sloped surface (sloped surface), 217: exit light reflection portion (light refracting portion), 316b, 416b, 516b, 616b: optical sheet light exit surface (light exit surface), EY: eyeball (eye), EYa crystalline lens (eye), EYb: retina (eye), HD: head portion, HMD head mounted display, HMDa: head mounting device, RE: lens

The invention claimed is:

1. A display device comprising:
a display panel; and
a lighting device supplying light to the display panel, the lighting device including
a light source, and
a light guide plate disposed in parallel to the display panel and having an edge surface as a light entering surface that is opposite the light source and through which light rays from the light source enter and having a plate surface as a light exit surface through which the light rays exit,
the light guide plate including a light refracting portion that applies an anisotropic refracting action to some of the light rays exiting an edge portion of the light exit surface of the light guide plate to be directed to a middle section of the display panel, wherein
the light refracting portion includes prism portions on the light exit surface of the light guide plate, the prism portions extend in a first direction that is a normal direction of the light entering surface and are arranged in a second direction that is a longitudinal direction of the light entering surface, and each of the prism portions includes a top portion and a first sloped surface and a second sloped surface that have the top portion therebetween,
the prism portions at least include a top portion off-centered prism portion in the edge portion of the light exit surface with respect to the second direction, the top portion off-centered prism portion has the top portion off-centered to a middle section of the light exit surface with respect to the second direction,
one of the prism portions that is closest to an edge of the light exit surface in the second direction is the top portion off-centered prism portion, and
the first sloped surface is closer to the middle section of the light exit surface with respect to the second direction and the second sloped surface is closer to the edge of the light exit surface with respect to the second direction, and the top portion off-centered prism portion that is closest to the edge of the light exit surface with respect to the second direction has the second sloped surface having an area greater than that of the first sloped surface.

2. A display device comprising:
a display panel; and
a lighting device supplying light to the display panel, the lighting device including
a light source, and
a light guide plate disposed in parallel to the display panel and having an edge surface as a light entering surface that is opposite the light source and through which light rays from the light source enter and having a plate surface as a light exit surface through which the light rays exit, the light guide plate including a light refracting portion that applies an anisotropic refracting action to some of the light rays exiting an edge portion of the light exit surface of the light guide plate to be directed to a middle section of the display panel, wherein the light refracting portion includes prism portions on the light exit surface of the light guide plate, the prism portions extend in a first direction that is a normal direction of the light entering surface and are arranged in a second direction that is a longitudinal direction of the light entering surface, and each of the prism portions includes a top portion and a first sloped surface and a second sloped surface that have the top portion therebetween, the prism portions at least include a top portion off-centered prism portion in the edge portion of the light exit surface with respect to the second direction, the top portion off-centered prism portion has the top portion off-centered to a middle section of the light exit surface with respect to the second direction, one of the prism portions that is closest to an edge of the light exit surface in the second direction is the top portion off-centered prism portion, and the first sloped surface is closer to the middle section of the light exit surface with respect to the second direction and the second sloped surface is closer to the edge of the light exit surface with respect to the second direction, and the top portion off-centered prism portion that is closest to the edge of the light exit surface with respect to the second direction has the second sloped surface having an inclination angle with respect to the second direction that is smaller than an inclination angle of the first sloped surface.

3. A display device comprising:

a display panel; and a lighting device supplying light to the display panel, the lighting device including a light source, and a light guide plate disposed in parallel to the display panel and having an edge surface as a light entering surface that is opposite the light source and through which light rays from the light source enter and having a plate surface as a light exit surface through which the light rays exit, the light guide plate including a light refracting portion that applies an anisotropic refracting action to some of the light rays exiting an edge portion of the light exit surface of the light guide plate to be directed to a middle section of the display panel, wherein the light refracting portion includes prism portions on the light exit surface of the light guide plate, the prism portions extend in a first direction that is a normal direction of the light entering surface and are arranged in a second direction that is a longitudinal direction of the light entering surface, and each of the prism portions includes a top portion and a first sloped surface and a second sloped surface that have the top portion therebetween, the prism portions at least include a top portion off-centered prism portion in the edge portion of the light exit surface with respect to the second direction, the top portion off-centered prism portion has the top portion off-centered to a middle section of the light exit surface with respect to the second direction, one of the prism portions that is closest to an edge of the light exit surface in the second direction is the top portion off-centered prism portion, and the prism portions include all the top portion off-centered prism portions and the second sloped surface includes all second sloped surfaces, and inclination angles of the second sloped surfaces with respect to the second direction is decreased as a position of the top portion off-centered prism portion becomes closer to the edge from the middle section of the light exit surface.

* * * * *